United States Patent [19]

Shacklette et al.

[11] Patent Number: 5,422,423
[45] Date of Patent: Jun. 6, 1995

[54] THERMALLY STABLE ELECTRICALLY CONDUCTIVE CONJUGATED POLYMER COMPLEXES HAVING HYDROGEN BONDING COUNTERIONS

[75] Inventors: Lawrence W. Shacklette, Maplewood; Chien-Chung Han, Madison, both of N.J.; Ronald L. Elsenbaumer, Arlington, Tex.

[73] Assignee: AlliedSignal Inc., Morris Township, Morris County, N.J.

[21] Appl. No.: 892,859

[22] Filed: Jun. 3, 1992

[51] Int. Cl.⁶ .................. C08G 73/06; C08G 75/00; H01B 1/00
[52] U.S. Cl. .................. 528/422; 528/332; 528/391; 528/423; 528/424; 428/402; 252/500; 252/511; 252/518
[58] Field of Search ............... 528/332, 422, 391, 423, 528/424; 252/500, 511, 518; 428/402

[56] References Cited

U.S. PATENT DOCUMENTS

| | | |
|---|---|---|
| 3,963,498 | 6/1976 | Trevoy . |
| 4,798,685 | 1/1989 | Yaniger . |
| 4,806,271 | 2/1989 | Yaniger et al. ............... 252/500 |
| 4,851,487 | 7/1989 | Yaniger et al. ............... 525/540 |
| 4,855,361 | 8/1989 | Yaniger et al. ............... 525/436 |
| 4,935,163 | 6/1990 | Cameron et al. ............. 528/422 |
| 4,940,640 | 7/1990 | MacDiarmid ................. 427/43 |
| 4,983,322 | 1/1991 | Eisenbammer ................ 528/422 |
| 5,034,463 | 7/1991 | Brokken-Zijp et al. . |
| 5,066,278 | 11/1991 | Hirschberg et al. . |
| 5,069,820 | 12/1991 | Jen et al. ...................... 252/500 |
| 5,079,334 | 1/1992 | Epstein et al. ................ 528/422 |

FOREIGN PATENT DOCUMENTS

| | | |
|---|---|---|
| 0017717 | 2/1980 | European Pat. Off. . |
| 0055358 | 10/1981 | European Pat. Off. . |
| 0361429 | 4/1990 | European Pat. Off. . |
| WO89/01694 | 2/1989 | WIPO . |
| WO90/01775 | 2/1990 | WIPO . |
| WO90/10297 | 9/1990 | WIPO . |
| WO9010297 | 9/1990 | WIPO . |
| WO91/06887 | 5/1991 | WIPO . |
| WO9211645 | 7/1992 | WIPO . |
| WO9305519 | 3/1993 | WIPO . |

OTHER PUBLICATIONS

Somasiri, N. L. Dissertation entitled "Electrochemical Behavior and Constitution of Polyaniline and Polyacetylene." University of Pennsylvania Ph.D. 1985. pp. i-xii; 109-112; 158-177.

A. G. MacDiarmid et al., *The Polyanilines: A Novel Class of Conducting Polymers*, Mat Res. Soc. Symp. Proc. vol. 173, (1990), pp. 283-291.

M. Angelopoulos et al., *Polyaniline: Solutions, Films and Oxidation State*, Mol. Cryst. Liq. Cryst., vol. 160, (1988) pp. 151-163.

Y. Cao et al., *Influence of Chemical Polymerication Condictions on the Properties of Polyaniline*, Institute of Polymers and Organic Solids, Uni. of Cal. vol. 30, (1989) pp. 2305-2311.

*Primary Examiner*—Paul R. Michl
*Assistant Examiner*—P. Hampton-Hightower
*Attorney, Agent, or Firm*—Lois A. Gianneschi

[57] ABSTRACT

This invention relates to thermally stable electrically conductive conjugated polymer complexes comprising a substituted or unsubstituted positively charged conjugated polymer doped with a dopant anion substituted with one or more anionic functionalities as for example a sulfonate or phosphonate functionalities, and substituted with one or more hydrogen bonding groups such as hydroxyl or carboxyl.

30 Claims, No Drawings

THERMALLY STABLE ELECTRICALLY CONDUCTIVE CONJUGATED POLYMER COMPLEXES HAVING HYDROGEN BONDING COUNTERIONS

BACKGROUND OF THE INVENTION

1. Field of the Invention

This invention relates to thermally stable, electrically conductive substituted and unsubstituted doped conjugated polymer compositions having a relatively high electrical conductivity and preferably having relatively high thermal stability and to compositions comprising such conjugated polymers and other materials as for example fillers, polymers, and the like. Another aspect of this invention relates to polymer articles, including films, inks, fibers, coatings and the like formed from the polymer compositions of this invention.

2. Description of the Prior Art

There has recently been an increased interest in the electrochemistry and electrical phenomena of polymeric systems. Recently, work has intensified with polymers having extended conjugation in at least one backbone chain. One conjugated polymer system with strong hydrogen bonding and polar interactions currently under study is polyaniline. See for example European Patent No. 0017717 and U.S. Pat. Nos. 3,963,498, 4,025,463, 4,855,361, 4,798,685, 4,806,271, 4,851,487, 4,940,640, 4,798,685, 5,006,278 and 5,069,820; and PCT W089/01694 and PCT W090/102797. Another conjugated polymer system which is capable of strong hydrogen bonding and/or polar interactions is polypyrrole. See for example EP0055358.

SUMMARY OF THE INVENTION

One aspect of the present invention relates to an electrically conductive, doped, substituted or unsubstituted conjugated polymer comprised of an ionized conjugated polymer (polymeric cation) having one or more "hydrogen bonding groups" and one or more dopant solutes (anions) selected from the group consisting of organic species having at least one anionic group as for example a phosphonate or sulfonate acid functional group, and having one or more "hydrogen bonding groups", said hydrogen bonding groups of said dopant solute being capable of bonding with said hydrogen bonding groups of the conjugated polymer. Another aspect of this invention is articles formed from this conjugated polymer. This invention also relates to a composition comprising a matrix of one or more non-electrically conductive thermoplastic polymers and/or thermosetting resins having one or more doped conjugated polymers of this invention dispersed therein, and to articles formed from said composition. This invention also relates to a process for forming the composition of this invention by blending one or more doped conjugated polymers of this invention and one or more thermoplastic resins and/or thermosetting polymers.

As used herein a "conjugated polymer(s)" are homopolymers or copolymers which are comprised of alternating carbon-carbon double bonds (either singly or as part of an aromatic ring structure), and optionally including one or more heteroatoms such as oxygen, nitrogen, sulfur, selenium, phosphorous and the like along the polymer conjugated backbone or conjugated side chains thereof which can be rendered to an electrically conductive state (equal to or greater than about $10^{-8}$ S/cm as determined by the four-in-line probe method described in "Laboratory Notes on Electrical and Galvanometric Measurements" by H. H. Wieder, Elsevier Scientific Publishing Co., New York, N.Y., 1979) by doping with some dopants known in the art).

As used herein, an "organic radical" means a polymeric, monomeric or oligomeric organic radical; "electrically conductive" means that the doped conjugated polymer has a conductivity of at least about $10^{-8}$ S/cm (preferably equal to or greater than about $10^{-6}$ S/cm, more preferably equal to or greater than about $10^{-3}$ S/cm and most preferably equal to or greater than about 1 S/cm) as determined by the four-in-line probe method described in "Laboratory Notes on Electrical and Galvanometric Measurements" by H. H. Wieder, Elsevier Scientific Publishing Co., New York, 1979; "thermally stable" means an electrically conductive polymer having a half life for electrical conductivity equal to or greater than one hour in air at a temperature of 150° C.; "acid function" is an acid function having at least one proton or at least one function that can be thermally or chemically transformed into a proton under use conditions, such as $NH_4^+$, $PH_3S^+$, $N(CH_3)_2H_2^+$, $N(C_2H_5)H_3^+$ and the like such as a carboxylic acid, boric acid, sulfonic acid, sulfonic acid, phosphoric acid, phosphinic acid and the like; and "sulfur or phosphorus acid function" means acid groups containing a sulfur and/or phosphorus atom such as sulfonic acid, sulfonic acid, phosphoric acid, phosphinic acid, phosphonic acid and the like.

As used herein "hydrogen bonding group" means an organic or inorganic radical having one or more functional groups which are capable of interacting with any organic or inorganic radical to form one or more hydrogen bonding interactions, as for example hydrogen bonding functional groups such as —O—, —N—, —S—, —P—, —$CO_2^-$, halo, —C(O)—, —C(O)O—, N(H)C(O)—, —N(H)C(O)N(H)—, —OH, —OR, —NH—, —NR—, —$NH_2$, —N(H)(R), —N(R)(R), —$SO_3^-$, —$PO_2^=$, —$PHO_2^-$, —$PO_3^=$, —SH, and —SR, where R is an organic radical which may be substituted with acid functional groups, such as a sulfonic acid, sulfonic acid, phosphonic acid, phosphinic acid, phosphoric acid, carboxylic acid, boric acid group, and the derivatives thereof, such as salts and esters.

Several advantages flow from this invention. For example, the compositions of this invention exhibit relatively enhanced thermal stability. In those embodiments of the invention where the conjugated polymer is capable of strong hydrogen bonding or polar interactions and where the anion of the dopant species also includes substituents which are polar and hydrogen bonding, the composition of this invention exhibits enhanced conductivity, and, in addition, exhibits enhanced thermal stability.

DETAILED DESCRIPTION OF THE INVENTION

Conjugated polymers for use in the process of this invention may vary widely provided that the polymer includes one or more hydrogen bonding groups. The hydrogen bonding group can be at any position in the polymer as for example in a backbone chain, in a chain pendant to the main backbone or substituted to said backbone chain or said pendant chain, but is preferably in the main backbone. Illustrative of such polymers are poly(unsaturated) polymers such as substituted and unsubstituted polyacetylene; substituted or unsubstituted poly(heteroaromatics), such as poly(thienylenes), poly(pyrroles), poly(quinolines), poly(isothianaphthenes), poly(carbazoles), poly(alkyl thiophenes) and the like; substituted or unsubstituted poly(aromatics) such as poly(phenylene sulfides), poly(anilines), polyacenes, poly(phenylenes), poly(naphthalenes), poly(naphthols), and poly(perinaphthalenes); poly(benzoquinones); poly(azulenes); and substituted or unsubstituted poly(aromatic vinylenes) such as poly(phenylene vinylenes), poly(dimethoxyphenylene vinylenes), poly(naphthalene vinylenes) and the like; and substituted or unsubstituted poly(heteroaromatic vinylenes) such as poly(thienylene vinylenes), poly(furylene vinylenes), poly(carbazole vinylenes), poly(pyrrole vinylenes) and the like or derivatives thereof which include one or more hydrogen bonding groups.

Where the polymer does not include hydrogen bonding group in the backbone chains or in a pendant chain, as for example, polyphenylene, poly(naphthalene), poly(perinephthalene) and the like then only derivatives which are substituted by a hydrogen bonding group such as hydroxyl are suitable. Other polymers such as polypyrroles and polyanilines which include hydrogen bonding group in the polymer backbone need not be derivatized.

Preferred conjugated homopolymers or copolymers are "conjugated backbone homopolymers or copolymers". As used herein, "conjugated backbone homopolymers or copolymers" are conjugated homopolymers or copolymers in which all or substantially all of the conjugation is in the main backbone of the homopolymer or copolymer.

Preferred conjugated homopolymer or copolymers are substituted or unsubstituted polyanilines, poly(heterocycles), and aromatic or heteroaromatic vinylenes. Illustrative of preferred homopolymers or copolymers of poly(heterocycles), and aromatic or heteroamatic vinylenes are those described in more detail in U.S. Pat. Nos. 4,711,742 and 5,068,060 and PCT/WO88/00954. More preferred for the practice of this invention are conjugated polymers which have relatively low acidity (pKa>2, preferably >4 and most preferably >6) and which are readily doped by protonic acids as for example, polyaniline, poly(benzoquinone), polypyrrole, and poly(azobenzene).

More preferred conjugated backbone homopolymers or copolymers are poly(anilines) and polypyrroles. Most preferred polymers are polyanilines. As used herein, "poly(anilines)" are homopolymers or copolymers in which the recurring backbone monomeric units are selected from the group consisting of substituted or unsubstituted phenyl rings and amine linkages (—NH— or —NR— where R is a substituent other than hydrogen) which may contain varying amounts of substituted or unsubstituted quinoid rings and imine (—N=) linkages. As used herein, "neutral or undoped polyaniline" is characterized by an uncharged backbone, "polyaniline base" is a particular form of undoped polyaniline which contains at least one quinoid diimine linkage in the backbone and "electrically conductive or doped poly(aniline)" is characterized by a charged backbone which may be formed by a partial or complete protonation of the amine and/or imine nitrogen atoms. As used herein, "leuco-polyaniline" is a neutral form of polyaniline which is in a reduced form (low oxidation state) and which comprises to a substantial degree aromatic phenyl rings linked by amine (—NH—) linkages. Such leuco-polyanilines are preferably doped with oxidizing dopants (such as ferric salts).

Any form of such poly(anilines) can be conveniently used in the practice of this invention. Illustrative of useful forms are those described in Green, A. G. and Woodhead, A. E., CXVII-Aniline-black and Allied Compounds, Part II", *J. Chem. Soc.*, 101 pp. 1117 (1912) and Kobayashi, et al., "Electrochemical Reactions . . . of Polyaniline Film-Coated Electrodes", *J. Electroanal. Chem.*, 177, pp. 281-91 (1984) and in Shacklette, L. W., et al. "Structure and Properties of Polyaniline as Modeled by Single-Crystal Oligomers", *J. Chem. Phys.* 88 P 3955 (1988), which are hereby incorporated by references.

In the preferred embodiments of the invention, poly(anilines) for use in the invention are homopolymers and copolymers of the type derived from the polymerization of unsubstituted and substituted anilines of the Formula I:

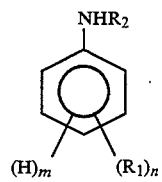

FORMULA I wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such as halo, hydrogen or other leaving group;

$R_1$ is the same or different at each occurrence and is selected from the group consisting of alkyl, deuterium, alkenyl, alkoxy, cycloalkyl, cycloalkenyl, alkanoyl, alkylthio, aryloxy, alkylthioalkyl, alkylaryl, arylalkyl, amino, alkylamino, dialkylamino, arylamino, diarylamino, alkylarylamino, aryl, alkylsulfinyl, aryloxyalkyl, alkylsulfinylalkyl, alkoxyalkyl, alkylsulfonyl, arylthio, alkylsulfonylalkyl, boric acid or salts or esters thereof, phosphoric acid or salts or esters thereof, sulfinate salts, arylsulfinyl, alkoxycarbonyl, arylsulfonyl, carboxylic acid or salts or esters thereof, phosphonic acid or salts or esters thereof, halo, hydroxy, cyano, sulfinic acid or salts or esters thereof, phosphinic acid or salts or esters thereof, sulfonic acid or salts or esters thereof, nitro, alkylsilane, or any of the foregoing aryl, aliphatic or cycloaliphatic groups substituted with one or more phosphonic acid or salts or esters thereof, sulfonic acid or salts or esters thereof, phosphoric acid or salts or esters thereof, boric acid or salts or esters thereof, sulfinic acid or salts or esters thereof, phosphinic acid or salts or esters thereof, carboxylic acid or salts or esters thereof, halo, nitro, amino, alkylamino, dialkylamino, arylamino, diarylamino, alkylarylamino, cyano or epoxy moieties; or any two $R_1$ groups together or any $R_1$ group together with any $R_2$ group may form a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may optionally include one or more divalent nitrogen, sulfur, sulfinyl, or salts or esters thereof, carbonyl, sulfonyl, or oxygen atoms wherein permissible substituents are one or more phosphonic acid or salts or esters thereof, sulfonic acid or salts or esters thereof, phosphoric acid or salts or esters thereof, boric acid or salts or esters thereof, phosphinic acid or salts or esters thereof, carboxylic acid or salts or esters thereof, halo, nitro, amino, alkylamino, sulfinic acid or salts or esters thereof, dialkylamino, arylamino, diarylamino, alkylarylamino, cyano or epoxy moieties; or $R_1$ is an aliphatic moiety having repeat units of the formula:

—(OCH$_2$CH$_2$)$_q$O—CH$_3$,
—(OCH$_2$CH(CH$_3$))$_q$O—CH$_3$,

—(CH$_2$)$_q$CF$_3$, —(CF$_2$)$_q$—CF$_3$ or —(CH$_2$)$_q$CH$_3$ wherein q is a positive whole number; and
$R_2$ is selected from the group consisting of permissible $R_1$ substituents and hydrogen.

Illustrative of useful $R_1$ groups are hydrogen, alkyl, such as methyl, ethyl, octyl, nonyl, tert-butyl, neopentyl, isopropyl, sec-butyl, dodecyl and the like, alkenyl such as 1-propenyl, 1-butenyl, 1-pentenyl, 1-hexenyl, 1-heptenyl, 1-octenyl and the like; alkoxy such as propoxy, butoxy, methoxy, isopropoxy, pentoxy, nonoxy, ethyoxy, octoxy, and the like; cycloalkenyl such as cyclohexenyl, cyclopentenyl and the like; alkanoyl such as butanoyl, pentanoyl, octanoyl, ethanoyl, propanoyl and the like; amino; alkylamino, such as methylamino, ethylamino, butylamino and the like; dialkylamino, such as dimethylamino, methylethylamino and the like; arylamino such as phenylamino, p-methylphenylamino and the like; diarylamino, such as diphenylamino, p-nitrophenyl-p'-methylphenylamino and the like; alkylarylamino, such as 2-phenyl-4-methylamino and the like; alkylsulfinyl, alkylsulfonyl, alkylthio, arylthio, arylsulfinyl, and arylsulfonyl such as butylthio, neopentylthio, methylsulfinyl, benzylsulfinyl, phenylsulfinyl, propylthio, octylthio, nonylsulfonyl, octylsulfonyl, methylthio, isopropylthio, phenylsulfonyl, methylsulfonyl, nonylthio, phenylthio, ethylthio, benzylthio, phenethylthio, sec-butylthio, naphthylthio and the like; alkoxycarbonyl such as methoxycarbonyl, ethoxycarbonyl, butoxycarbonyl and the like; cycloalkyl such as cyclohexyl, cyclopentyl, cyclo-octyl, cycloheptyl and the like; alkoxyalkyl such as methoxy-methyl, ethoxymethyl, butoxymethyl, propoxyethyl, pentoxybutyl and the like; aryloxyalkyl and aryloxyaryl such as phenoxyphenyl, phenoxymethyl and the like; and various substituted alkyl and aryl groups such as 1-hydroxybutyl, 1-aminobutyl, 1-hydroxypropyl, 1-hydroxypentyl, 1-hydroxyoctyl, 1-hydroxyethyl, 2-nitroethyl, trifluoromethyl, 3,4-epoxybutyl, cyanomethyl, 3-chloropropyl, 4-nitrophenyl, 3-cyanophenyl, and the like; acid and acid salts such as sulfonic acid, carboxylic acid and salts thereof; aliphatic or aryl groups substituted with an acid or salt thereof such as phosphonic acid, phosphinic acid, sulfonate salt, sulfinate salt, sulfonic acid, sulfonic acid, borate salt, phosphoric acid, boric acid, or carboxylic acid groups such as ethylsulfonic acid, propylsulfonic acid, 4-nitrobenzene sulfonic acid, butylsulfonic acid, phenylsulfonic acid, and the like.

Also illustrative of useful $R_1$ groups are divalent moieties derived from any two $R_1$ groups or a $R_1$ group with a $R_2$ group such as moieties having from about 2 to about 7 repeat units of the formula:

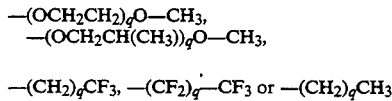

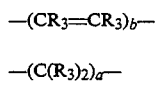

wherein $R_3$ is the same or different at each occurrence and is hydrogen or alkyl, as for example —(CH$_2$)$_4$—, —(CH$_2$)$_3$—, —(CH=CH—CH=CH)—, —[CH$_2$—CH(CH$_3$)—CH$_2$]— and —(CH$_2$)$_5$—, and groups comprised of such moieties which include one or more heteroatoms of oxygen, nitrogen, ester, sulfonyl, carbonyl, sulfinyl, and/or sulfur, such as —CH$_2$SCH$_2$— —CH$_2$NHCH$_2$—, —SCH$_2$NHCH$_2$—, —O—CH$_2$—CH$_2$O— —O—CH$_2$—S—CH$_2$—, —CH$_2$S(O$_2$)CH$_2$—, CH$_2$S(O)CH$_2$—, —OC(O)CH$_2$CH$_2$—, —CH$_2$C(O)CH$_2$— and —CH$_2$—O—CH$_2$— to form heterocyclic amino compounds such as tetrahydronaphthylamine, dihydrobenzopyrroleamine, benzofuranamine, dihydrobenzopyranamine, dihydrobenzofuranamine, dihydrobenzoparaoxazineamine, dihydrobenzoparadiazineamine, dihydrobenzotriazoleamine, dihydro-benzothiazineamine, benzothiopyranamine, dihydro-benzoxazoleamine and the like. Exemplary of useful $R_3$ groups are divalent alkenylene chains containing 1 to about 3 unsaturated bonds such as divalent 1,3-butadiene and like moieties which may also include one or more divalent oxygen, nitrogen, sulfinyl, sulfonyl, carbonyl, ester, and/or sulfur groups which form such compounds as benzodiazineamine, benzodiazoleamine, benzotriazepine-amine, benzimidazolylamine, benzisoxazoleamine, benzoxazolylamine, benzothiazineamine, benzoxazineamine, naphthaleneamine, benzopyranamine, benzothiazineamine, anthraceneamine, aminobenzothio-pyran, aminobenzodiazine, benzthiopyrone amine, amino-coumarin, benzthiopheneamine, benzothiodiazoleamine, and the like.

Exemplary of useful $R_2$ groups are hydrogen and the above-referenced representative $R_1$ groups described above such as alkyl as for example, methyl, ethyl, isopropyl, butyl, isobutyl, hexyl, octyl and the like; alkylsulfonyl such as methylsulfonyl, ethylsufonyl, propylsulfonyl and the like; arylsulfonyl such as phenylsulfonyl, p-methyl phenylsulfonyl, naphthylsulfonyl and the like.

Preferred polyaniline consists of repeat units of the Formulas II and/or III:

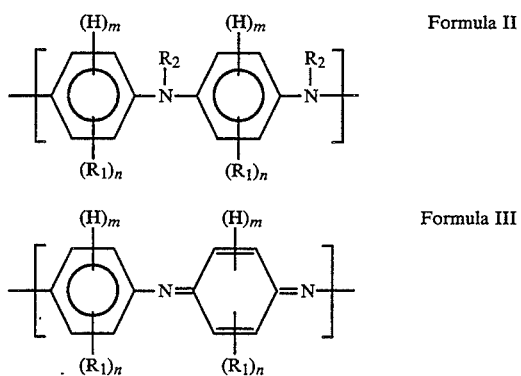

a combination thereof having various ratios of the above repeat units in the polyaniline backbone such as leucoemeraldine, protoemeraldine, emeraldine, nigraniline and pernigraniline. Poly(anilines) useful in the practice of this invention are more preferably those of the Formula IV:

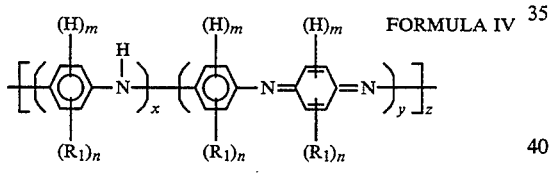

wherein:
n, m, $R_1$ and $R_2$ are as described above;
x and y are the same or different at each occurrence and are integers equal to or greater than 0, with the proviso than the sum of x and y is greater than 0, preferably where x is an integer equal to or greater than 0 and/or that the ratio of x to y is greater than or equal to about 0, more preferably said ratio is equal to or greater than 0.5 and most preferably said ratio is equal to or greater than about 1; and
z is the same or different at each occurrence and is an integer equal to or greater than about 5.

Preferred for use in the practice of this invention are poly(anilines) of the above Formula IV in which:
n is an integer from 0 or 1;
m is an integer from 3 or 4, with the proviso that the sum of n and m is equal to 4;
R is phenyl, or alkyl or alkoxy having from 1 to about 12 carbon atoms, a protonic acid function or a salt or ester thereof, or alkyl, phenyl or alkoxy substituted with one more or protonic acids or salts or esters thereof;
x is an integer equal to or greater than 1;
y is equal to or greater than 0, with the proviso that the ratio of x to y is equal to or greater than 0.5;
z is an integer equal to or greater than about 5;

Particularly preferred for use in the practice of this invention are poly(anilines) of the above Formula IV in which:
n is an integer from 0 or 1;
m is an integer from 3 or 4 with the proviso that the sum of n and m is equal to 4;
$R_1$ is alkyl or alkoxy having from 1 to about 6 carbon atom or carboxylic acid or salts or esters thereof, phosphinic acid or salts or esters thereof, sulfonic acid or salts or esters thereof, sulfonic acid or salts or esters thereof, phosphonic acid or salts or esters thereof, or alkyl or alkoxy substituted with phosphinic acid or salts or esters thereof, sulfonic acid or salts or esters thereof, halo phosphonic acid or salts or esters thereof, or sulfonic acid or salts or esters thereof;
x is an integer equal to or greater than 2;
y is equal to or greater than 0, with the proviso that the ratio of x to y is greater than about 1; and
z is an integer equal to or greater than about 10.

Amongst the preferred embodiments, more preferred for use in the practice of this invention are poly(anilines) of the above Formula IV in which:
n is an integer from 0 or 1;
m is an integer from 3 or 4, with the proviso that the sum of n and m is equal to 4;
$R_1$ is alkoxy or alkyl of from 1 to about 3 carbon atoms, sulfonic acid or salts thereof, phosphoric acid or salts thereof, or phosphonic acid or salts thereof;
x is an integer equal to or greater than 2; and
y is an integer equal to or greater than 1, with the proviso that the ratio of x to y is equal to or greater than about 2; and
z is an integer equal to or greater than about 10.

In the most preferred embodiment of the invention
n is 0;
m is 4:
x is an integer equal to about 2;
y is an integer equal to about 1 with the proviso that the ratio of x to y is equal to or greater than about 2; and
z is an integer equal to or greater than about 10.

In general, the number of aniline repeat units is not critical and may vary widely. The greater the number of aniline repeat units the greater the viscosity and molecular weight of the polyaniline. In those applications where a polyaniline of lower molecular weight and viscosity is required, such material may be used, and in those applications where a polyaniline of high molecular weight and viscosity is required, then such material can be used. The number of aniline repeat units is preferably at least about 10. The upper limit can vary widely depending on the desired viscosity and molecular weight. In the more preferred embodiments of the invention, the number of aniline repeat units is at least about 20, and in the particularly preferred embodiments, the number of repeat units is at least about 30. Amongst the particularly preferred embodiments, most preferred are those embodiments in which the number of repeat units is at least about 40.

Conjugated homopolymers and copolymers can be conveniently prepared through conventional procedures. Such procedures are well known in the art and will not be described herein in great detail. See for example U.S. Pat. Nos. 4,940,640; 4,711,742; 4,521,589; 4,808,681; 4,983,322; 5,006,278 and 4,900,782; PCT WO88/00954; and "The Handbook of Conducting Polymers", edited by Terje A. Skotheim, Marcell Decker, Inc., New York and Basel and references cited therein, all of which is hereby incorporated by reference. For example, preferred polyanilines can be prepared through use of chemical and electrochemical synthetic procedures. For example, one form of polyaniline can be prepared chemically by treating a suitable aniline with an oxidant such as ammonium persulfate $(NH_4)_2S_2O_8$ in excess acid such as 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is dark blue in color and which has a conductivity of less than $10^{-8}$ S/cm. Other chemical procedures for preparation of various chemical forms of polyaniline are described in detail in Green et al and U.S. Pat. Nos. 4,855,361, 4,798,685, 4,806,271, 4,822,638, 4,851,487 and 4,940,517 described above.

Useful forms of conjugated polymers can also be prepared electrochemically. For example, useful forms of polyaniline can be prepared by the electrochemical oxidation of aniline in aqueous fluoroboric acid electrolyte on a platinum foil anode.

Other useful conjugated polymers can be prepared pyrolytically. For example, polyacenes can be prepared by the pyrrolysis of phenolic resins as described in greater detail in U.S. Patent Nos. 4,615,960; 4,628,015; 4,601,849; and 4,753,717.

Other chemical and electrochemical syntheses and transformations of the conductive form of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations of the appended claims.

The conjugated polymer may be electrically neutral or electrically conductive. The Conjugated polymer is rendered electrically conductive by doping with a dopant solute. In general, such dopant solute is derived from a dopant compound, which upon addition to the conjugated polymer, introduces positive charge carriers onto the polymer backbone with co-committent formation of an anionic dopant solute species (dopant anion) to form a charge transfer complex with the conjugated polymer, which complex has a conductivity equal to or greater than about $10^{-8}$ ohm$^{-1}$cm$^{-1}$ by the four-in-line probe method.

Dopants for use in the practice of this invention are critical and must include one or more hydrogen bonding groups. The particular dopant of choice will depend on the particular form of the undoped conjugated polymer. For example, if the polymer is initially in a reduced state (e.g. reduced polypyrrole or leuco-polyaniline) then the dopant of choice would be an oxidizing dopant or combination of dopants which includes at least one oxidizing dopant. Alternatively, if the polymer were a base, as for example polyaniline base, then the preferred dopant would be an acid.

The dopant or dopant combination must also be chosen such that the resulting conductive polymer complex contains a polymer cation and a dopant solute (anion) where the solute is an organic species having at least one anionic functionality (preferably a sulfur and/or phosphorus containing functionality) and at least one hydrogen bonding group in order to provide the enhanced thermal stability of this invention. While we do not wish to be bound by any theory, it is believed that such selected dopant solutes allow for hydrogen bonding interactions between the hydrogen bonding groups of the conjugated polymer and the hydrogen bonding group of the dopant anion which strengthens the bonding between the dopant anion and the polymer cation over and above that provided by the primary ionic interaction between the polymer cation and the dopant anion. For example, in the case of polyaniline, it is believed that the hydrogen bonding interactions would be between the amine and/or imine linkages in the polyaniline backbone and the hydrogen bonding group of the dopant solute. Such increased bond strength leads to increased thermal stability. Although not critical, it is believed that these interactions are maximized when the distance between at least one anionic functionality and the hydrogen bonding group of the dopant anion are such that the anionic functionality and the hydrogen bonding group are capable of coordinating with adjacent hydrogen groups bonding along the backbone of a single chain of the conjugated polymer, as for example the amine and/or imine linkages in the case of polyaniline. In the preferred embodiments of the invention, when the conjugated polymer is an unsubstituted polyaniline, the preferred distance between at least one anionic functionality and at least one hydrogen bonding group is approximately about 5 Å to about 6 Å.

Likewise dopants containing multiple anionic functionalities such as sulfonic acid groups, phosphonic acid groups, boric acid groups, carboxylic acid groups, phosphoric acid groups, boronic acid groups, and the like, are preferred over dopants which contain only a single anionic functionalities, since in this case the strength of ionic bonding between the resulting dopant anion and the polymer cation is increased because such additional anionic functionalities and hydrogen bonding groups provide additional hydrogen bonding as well. Moreover, with additional bonding provided by multiple hydrogen bonding groups and/or anionic functionalities, bonding to and between multiple chains can also take place. It is believed that such bonding leads to a more rigid three-dimensional bonded structure which will act to limit the loss of dopant by diffusion and violatization at relatively high temperature. For example, the periodicity of the charge density wave, which forms at the highest doping levels for polyaniline, corresponds to the distance between every second nitrogen linkage along the polyaniline backbone. In the preferred embodiments where the polyaniline is an unsubstituted polyaniline, the preferred distance between multiple acid groups is from about 9 Å to about 11 Å.

Useful hydrogen bonding groups may vary widely and essentially any hydrogen bonding group may be useful. Illustrative of useful groups are those described in A. F. M. Barton, "Handbook of Solubility Parameters", CRC Press, Boca Raton, Fla. pp. 85–86 and Pimentel and McClellan, "The Hydrogen Bond", W. H. Freeman Company, San Francisco (1960). Useful groups usually are those containing an oxygen, nitrogen, phosphorus, sulfur and halogen. The oxygen may be singly or doubly bonded, and the nitrogen singly, doubly or triply bonded. Still other useful groups are weakly hydrogen bonding groups, carbon double and triple bonds and aromatic rings.

Illustrative of other useful hydrogen bonding functions are fluoro, cyano, hydroxy, carboxyl, chloro, bromo, iodo, sulfoxide, sulfone, sulfonamide, amino, imino, nitro, phenyl, carbonyl containing groups such as an aldehydes, amides, esters, urethanes, ketones and the like, alkoxy such as methoxy and ethoxy, aromatic sulfones, oxides and sulfoxides as for example phenyl oxide, diphenyl oxide, phenyl sulfoxide and phenylsulfone, and haloalkyl such as trifluoromethyl, organic or inorganic acids and their esters such as carboxylic acid and boric acid. Preferred hydrogen bonding groups are oxygen containing groups such as hydrogen, hydroxy, carboxylic acid, ethers, and carbonyl, and halo, and the more preferred hydrogen bonding substituent is hydroxy.

Hydrogen bonding groups can also be classified according to their propensity to act as hydrogen acceptors or donors. Examples of hydrogen acceptors include functional groups containing oxygen, as for example a carbonyl, carboxylate or ether functionality, halo, functional groups containing nitrogen such as divalent amine (—NH—) or imino nitrogen (—N=), sulfonate, phosphonate, sulfinate and the like. Examples of donors include amines such as —$NH_2$, —NHR (where R is an organic radical), or other hydrogen containing groups such as mercapto, hydroxy and sulfonamide. These groups also readily play a dual role and can function as either donor or acceptor depending on the environment.

Since the advantages of this invention derive from additional bonding between the dopant anion and the conjugated polymer cation, the placement of substituent groups in a manner which could allow bonding to each other is preferably avoided. For example, 4-hydroxybenzene sulfonic acid would be preferred over 2-hydroxybenzene sulfonic acid, since in the latter case, internal bonding between hydroxy and sulfonate groups can readily occur. Such bonding would tend to decrease the desired interaction with the conjugated polymer. Likewise, even though multiple acid groups and hydrogen bonding groups on the same anion would be generally expected to be beneficial, such benefit can be lost if donor and acceptor groups are substituted such that they interact or bond to themselves rather than too the conjugated polymer. For example, benefit can be derived from the addition of a hydroxy group to naphthalene disulfonic acid as for example with 1-hydroxynaphthalene 3,6-disulfonic acid. On the other hand such benefit is decreased with 3,6-dihydroxynaphthalene 2,7-disulfonic acid because of the juxtaposition of hydrogen bonding donor and acceptor groups. Thus, in the preferred embodiments of this invention hydrogen bonding groups and acid functions are not substituted at adjacent positions.

In dopant anions for use in the preferred embodiments of the invention, one or more anionic functionalities and the one or more hydrogen bonding groups are bonded to an organic substrate (radical) such as an aliphatic radical as for example, alkoxyalkyl, alkyl and like, an aromatic radical such as phenyl, diphenyl oxide, biphenyl sulfide, biphenyl methane, triphenyl methane, biphenyl, diphenyl sulfoxide, diphenyl sulfone, anthracyl, naphthyl, phenanthryl and the like or a polymeric or oligomeric substrate such as a polymer having recurring pendant aromatic groups in the polymeric backbone or other oligomeric or polymeric groups in the backbone or pendant to it, such as poly(naphthalene), poly(ethylene), poly(acetylene), poly(acrylic acid), phenolic, poly(phenylene), poly(acene), poly(perinaphthalene), polystyrene, poly(2-methylstyrene), poly(4-phenylstyrene), poly(2-vinyl naphthalene), poly(vinyl benzoate), poly(benzyl methacrylate) and the like. Preferred substrates are rigid. For example, aromatics and fused ring systems are preferred over aliphatic systems. In the particularly preferred embodiments of the invention, the substrate is aromatic and in the most preferred embodiments of the invention the substrate is phenyl or naphthyl.

Dopants for use in this invention may vary widely include oxidizing dopants and protonic acid dopants. Illustrative of useful oxidizing dopants are $NO_2^+$ and Fe(III) salts such as those of the formulas $NO_2R_7SO_3$, $NO_2R_7CO_2$, $NO_2R_7SO_2$, $Fe(R_7SO_3)_3$, $Fe(R_7CO_2)_3$, and $Fe(R_7SO_2)_3$, which give rise to doped polymers containing dopant anions of the formulas: $R_7SO_3^-$, $R_7CO_2^-$ and $R_7SO_2^-$, wherein $R_7$ is an organic radical having the required hydrogen bonding substituent.

In the preferred embodiments of the invention, the dopant is an organic protonic acid. The acid functionality of the dopant may vary widely. The only requirement is that the acid is capable of partially or completely protonating the conjugated polymer to form a charge-tranfer complex comprising the dopant anion and the polymer cation. For example, in the case of polyaniline, the acid should be capable of protonating the nitrogen of the amine linkage, imine linkage or a combination thereof. This can usually be accomplished when the pKa of the acid function is less than that of the conjugated polymer in the doping medium. In the case of polyaniline, acids having a pKa of less than about 5 are preferably used. Such acid functionalities include but are not limited to sulfur or phosphorus acid functionalities such as sulfonic acid functionalities, sulfonic acid functionalities, sulfuric acid functionalities, phosphorous acid functionalities, phosphoric acid functionalities, phosphonic acid functionalities, phosphinic acid functionalities, and the like. Preferred acid functionalities are sulfur acid functionalities, more preferred acid functionalities are sulfonic and sulfonic acid functionalities, and most preferred acid functionalities are sulfonic acid functionalities. Whether the dopant(s) is (are) an acid, a salt or an oxidant, the resulting anionic functionality in the conductive polymer complex should preferably be a sulfonate functionality, a sulfinate functionality, a phosphonate functionality or a phosphinate functionality, more preferably they should be a sulfonate or sulfinate functionality and most preferably they should be sulfonate functionality.

Preferred for use in the practice of this invention for doping the particle at or near the surface of the particles are organic acid dopants having anionic moieties of the formulas:

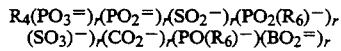
$(SO_3)^-)_s(CO_2^-)_s(PO(R_6)^-)(BO_2^=)_r$ and having a cationic moiety or moieties of the Formula:

wherein at least one of the cationic moieties of the formula $M^{+s}$ is a proton or is a moiety which can be transformed into a proton under use conditions;

$M^{+s}$ is a cationic species having a positive charge s;

s is an integer equal to or greater than 1, preferably from 1 to about 8;

$R_4$ is an organic radical, with the proviso that $R_4$ includes one or more hydrogen bonding groups;

r is an integer equal to or greater than 1, preferably from 1 to about 8; and $R_6$ is hyydrogen, alkyl, aryl, alkylaryl, aryloxy, arylalkoxy, alkylsulfinyl, alkylthio, alkylsulfonyl or alkoxy.

In these preferred embodiments of the invention, it is preferred that at least one acid functionality and at least one hydrogen bonding group not be adjacent to each other. More preferred are those dopants in which r is greater than 1. Although not critical, it is most preferred that the distance between at least one acid functionality and at least one hydrogen bonding group is such that they are far enough apart so that the acid functionality and the hydrogen bonding group are capable of coordinating along the backbone of a single conjugated polymer chain. For example in the case of polyaniline the dopant is capable of coordinating with adjacent amine and/or imine linkages along the backbone of a single chain of polyaniline. In the case of unsubstituted polyaniline, this distance is from about 5 Å to about 6 Å.

More preferred for use in the practice of this invention as dopants are acids or acid derivatives of the formula:

$R_4(PO_2(R_6)M)_g(PO_3M_2)_f(SO_3M)_c(CO_2M)_d(PO_2M_2)_t(SO_2M)_h$ $(PO(R_6)M)_i$ or

-continued

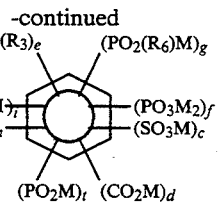

wherein:

M is H+, or other metal or non-metal cation with the proviso that at least one of M is H+ or a moiety which can be thermally or chemically transformed into a proton under use conditions, such as $NH_4^+$, $N(CH_3)_2H_2^+$, $PhS^+$, $N(C_2H_5)H_3^+$ and the like;

t is 0, 1, 2, 3 or 4;

h is 0, 1, 2, 3 or 4;

i is 0, 1, 2, 3 or 4;

c is 0, 1, 2, 3 or 4;

d is 0, 1, 2, 3 or 4;

f is 0, 1, 2, 3 or 4;

g is 0, 1, 2, 3 or 4, with the proviso that at least one of c, d, f, g, h, i or t is other than 0;

e is 0, 1 or 2; and $R_4$ is alkyl substituted with one or more aryl, alkythio, alkoxycarbonyl, alkylcarbonyl, carbonyl, alkylcarbonylalkyl, alkylsulfinylalkyl, alkylsulfonylalkyl, alkylaminoalkyl, aryloxy, hydroxy, alkylamino, dialkylamino, alkylarylamino, halo, amino, (alkyl)arylamino, di(alkyl)arylamino, alkylaryl, alkylthioalkyl, alkylarylamino, alkoxy, alkoxyalkyl, alkylaryl, alkylsulfinyl, alkylsulfonyl, dialkylaminoalkyl, aryloxyalkyl, aryloxyalkoxy, alkoxyaryl, alkylaryloxy or alkoxyaryloxy with the proviso that $R_4$ includes at least hydrogen bonding group;

$R_5$ is the same or different at each occurrence and is a hydrogen bonding group such as halo, carbonyl, or hydroxy, or an unsubstituted or substituted alkoxycarbonyl, alkylcarbonyl, alkylcarbonylalkyl, alkylsulfinylalkyl, alkylsulfonylalkyl, alkylaryloxy, alkoxyaryloxy, alkylaminoalkyl, alkylamino, dialkylamino, alkylarylamino, (alkyl)arylamino, di(alkyl)arylamino, alkylthioalkyl, amino, alkylarylamino, alkoxy, alkoxyalkyl, alkylaryl, alkylsulfinyl, alkylthio, alkysulfonyl, dialkylaminoalkyl, aryloxyalkyl, aryloxyalkoxy, alkoxyaryl, alkylaryloxy or alkoxyaryloxy, or substituted alkyl or alkylaryl, wherein permissible substituents include hydrogen bonding groups such as sulfonic acid or a salt or ester thereof, sulfonic acid or a salt or ester therof, phosphonic acid or a salt or ester thereof, phosphinic acid or a salt or ester thereof, phosphoric acid or a salt or ester thereof, carboxylic acid or a salt or ester thereof, boric acid or a salt or ester thereof, perhaloalkyl, phenyl, alkoxy, aryloxy, halo, cyano, amino, haloalkyl, hydroxy, nitro, and the like, or any two or more $R_5$ substituents together may form an alkylene or alkenylene chain completing a ring system such as a fused or spiro ring system which may include one or more cyclic rings, which chain is substituted with one or more of the aforementioned hydrogen bonding groups, or $R_5$ is a moiety of the formula:

—$(OCH_2CH_2)_qOCH_3$ or
—$(OCH_2CH(CH_3))_qOCH_3$ wherein:
q is a positive whole number from 6 to about 12 or alkyl substituted with said moiety; and
$R_6$ is hydrogen, alkyl, aryl, alkylaryl, aryloxy, arylalkoxy, alkylsulfinyl, alkylthio, alkylsulfonyl or alkoxy.

In the particularly preferred embodiments of this invention, useful dopants are acids and/or acid derivatives of the above formula:

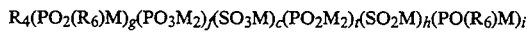

or

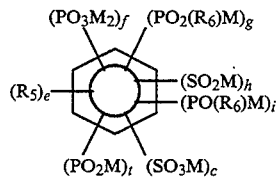

wherein:
c, t, f, g, h and i are the same or different at each occurrence and are 0, 1, 2, or 3, with the proviso that at least one of c, d, t, f or g, i or h is other than 0;
e is 1 or 2;
$R_4$ is substituted alkyl or phenylalkyl wherein permissible substituents are selected from the group consisting of alkoxy, halo, phenyl, hydroxy, carboxy, carboxylic acid, alkoxyphenyl, alkylphenyl, alkylphenoxy, carbonyl, phenoxy, sulfophenoxy, haloalkyl, amino, perhaloalkyl, alkoxyphenyl, alkylphenyl, alkylthio or alkylthioalkyl with the proviso that $R_4$ is substituted with one or more hydrogen bonding substituents;
$R_5$ is the same or different at each occurrence and is a hydrogen bonding group selected from the group consisting of alkoxy, halo, phenyl, hydroxy, amino, alkoxyphenyl, carboxy, carboxylic acid, alkylphenoxy, alkylphenyl, phenoxy, sulfophenoxy, haloalkyl, perhaloalkyl, alkoxyphenyl, alkylphenyl, alkylthio or alkylthioalkyl or any two $R_5$ substituents together may form an substituted alkylene or alkenylene chain completing an aromatic or an alicyclic ring system wherein permissible substituents are one or more of said hydrogen bonding groups $R_5$ is a moiety of the formula:

—(OCH$_2$CH$_2$)$_q$OCH$_3$ or
—(OCH$_2$CH(CH$_3$))$_q$OCH$_3$ wherein:
q is a positive whole number from 6 to about 12, with the proviso that $R_5$ is a hydrogen bonding substituent a substituent which is substituted with a hydrogen bonding substituent.
$R_6$ is hydrogen, alkyl, alkoxy or substituted or unsubstituted phenoxy, phenyl or phenylalkyl wherein permissible substitutients are alkyl, alkoxy or a combination thereof; and
M is H+, or other metal or non-metal cation, with the proviso that at least one of M is H+ or a moiety which can be thermally or chemically transformed into a proton under use or process conditions.

In the most preferred embodiments of this invention, useful dopants for doping the particles at or near its surface are acids and/or acid derivaties of the formula:

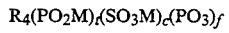

or

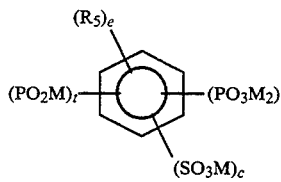

wherein:
c, f and t are the same or different and are 0, 1 or 2, with the proviso that at least one of c, f and t is not 0;
e is 1 or 2;
$R_4$ is alkyl or phenylalkyl substituted with a hydrogen bonding substituent such as one or more carbonyl, halo, carboxyli acid or a salt thereof, phenoxy, hydroxy, sulfophenoxy or alkoxy substituents with the proviso that at least one acid functionality and at least one hydrogen bonding group are not substituted to adjacent carbon atoms;
$R_5$ is the same are different at each occurrence and is a hydrogen bonding group selected from the group consisting of hydroxy, halo, carbonyl, phenoxy; or carboxylic acid or a salt thereof, or is alkyl, phenoxy, phenylalkyl or phenyl group substituted with one or more hydrogen bonding group such as phenoxy, carbonyl, protonic acid group or a salt or ester thereof (e.g. carboxylic acid, phosphinic acid, sulfonic acid, phosphonic acid, sulfonic acid and the like), hydroxy, halo, amino, cyano, sulfophenoxy or alkoxy substituents or any two or more $R_5$ substituents together may form an alkylene or alkenylene chain completing an aliphatic or aromatic ring system which is substituted with one or more of the aforesaid hydrogen bonding groups or one or more protonic acid functions or is substituted with an alkyl, phenylalkyl, phenoxy, alkylphenyl or phenyl group substituted with one or more of the aforesaid hydrogen bonding groups;
M is H+ or other metal or non-metal cation, with the proviso that at least one of M is H+ or is a moiety which can be thermally transformed into a proton under use or process conditions.

In the especially preferred embodiments of this invention, useful dopants for doping the particles at or near its surface are acids or acid derivatives of the formula:

or

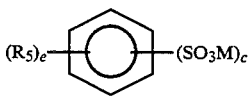

wherein:
c is 1, 2 or 3;
e is 1 or 2;

R4 is alkyl having at least about seven carbon atoms (preferably from about seven carbon atoms to about twenty or thirty carbon atoms) substituted with one or more hydrogen bonding groups such as halo (preferably fluoro), carbonyl, carboxylic acid, carboxy, hydroxy, phenoxy, phenoxy substituted with one or more sulfonic acid or a salt thereof and the like;

$R_5$ is a hydrogen bonding group such as halo (preferably fluoro), a protonic acid or a salt thereof (preferably carboxylic acid or carboxy), carbonyl, hydroxy, alkoxy, alkoxyalkyl, phenoxy, or phenoxy substituted with one or more sulfonic acid or a salt thereof and the like; or any two $R_5$ substituents together may form an alkenylene chain completing a naphthalene ring system which is substituted with one or more of the aforesaid hydrogen bonding groups; and M is $H^+$ or other metal or non-metal cation or a moiety which can be thermally tranformed into a proton under process conditions.

In the process of the embodiment of this invention of choice, the dopant for doping the particle at or near its surface is a sulfonic acid or sulfonic acid derivative of the formula:

or

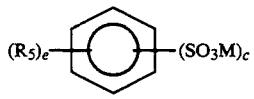

wherein;

$R_4$ is substituted alkyl wherein permissible substituents are one or more fluoro groups, carboxylic acid or a salt thereof, hydroxy groups or a combination thereof;

c is 1 or 2;

e is 1 or 2;

$R_5$ is the same or different at each occurrence and is one or more hydroxy, phenoxy substituted with one or more sulfonic acid or a salt thereof fluoro or carboxylic acid group or a salt thereof, or any two $R_5$ substituents together may form a divalent alkenylene chain completing a naphthalene ring, which ring substituted with one or more fluoro groups, phenoxy substituted with one or more sulfonic acid or a salt thereof, sulfonic acid or a salt thereof, carboxylic acid groups or a salt thereof or hydroxy; and M is a proton, or other metal or non-metal cation, with the proviso that at least one of M is proton.

The following is a listing of dopants which are useful in the practice of the most preferred embodiments of this invention for formation of the most preferred dopant anions.

perfluoro butyl sulfonic acid
2,5-dihydroxy-1,4-benzene disulfonic acid,
trion (4,5-dihydroxy-1,3-benzene disulfonic acid),
4-sulfophthalic acid,
1,8-dihydroxynaphthalene-3-6-disulfonic acid,
3,6-dihydroxynaphthalene-2,7-disulfonic acid,
4,5-dihydroxynaphthalene-2,7-disulfonic acid,
4-hydroxy biphenyl sulfonic acid
6,7-dihydroxy-2-naphthalene sulfonic acid,
1-naphthalene-5,7-dinitro-8-hydroxy sulfonic acid,
1-naphthalene-4-hydroxy sulfonic acid,
4-bromobenzene sulfonic acid,
4-hydroxy-5-isopropyl-2-methyl benzene sulfonic acid
3,4-diamino benzene sulfonic acid
3,4-dinitro benzene sulfonic acid,
2-methoxy benzene sulfonic acid,
1-naphthalene-5-hydroxy sulfonic acid,
1-naphthalene-7-hydroxy sulfonic acid,
1-naphthalene-3-hydroxy sulfonic acid,
2-naphthalene-1-hydroxy sulfonic acid,
4-phenylamino benzene sulfonic acid,
1,3-naphthalene-7-hydroxy disulfonic acid
trifluoromethane sulfonic acid,
anthraquinone sulfonic acid,
anthraquinone disulfonic acid,
4-hydroxybenzene sulfonic acid,
1-naphthol-3,6-disulfonic acid,
diphenylether-4,4'-disulfonic acid,
diphenylsulfone-4,4'-disulfonic acid,
2,5-dihydroxy-1,4-benzene disulfonic acid
sulfosalicylic acid
4-chlorobenzene sulfonic acid Less preferred but also useful as dopants are phosphorus based organic acids which contain hydrogen bonding groups as for example phosphonoformic acid and 2-carboxyethylphonphonic acid.

The amount of dopant added to the conjugated polymer may vary widely. In general, sufficient dopant is added to the conjugated polymer such that the conductivity of at least about $10^{-9}$ ohm$^{-1}$cm$^{-1}$. The upper level of conductivity is not critical and will usually depend on the type of conjugated polymer employed and the dopant. Preferably, the highest level of conductivity that can be obtained is provided without unduly adversely affecting the environmental stability of the conjugated polymer. In the preferred embodiments of the invention, the amount of dopant employed is sufficient to provide a conductivity of at least about $10^{-8}$ ohm$^{-1}$cm$^{-1}$ and in the particularly preferred embodiments is sufficient to provide a conductivity of from about $10^{-4}$ ohm$^{-1}$cm$^{-1}$ to about $10^{+3}$ ohm$^{-1}$cm$^{-1}$. Amongst these particularly preferred embodiments, most preferred are those embodiments in which sufficient dopant is employed to provide a conductivity of at least about $10^{-1}$ ohm$^{-1}$cm$^{-1}$ to about $10^{+3}$ ohm$^{-1}$cm$^{-1}$, with amounts sufficient to provide a conductivity from about $10^0$ ohm$^{-1}$cm$^{-1}$ to about $10^{+3}$ ohm$^{-1}$cm$^{-1}$ usually being the amounts of choice.

The method of forming the thermally stable electrically conductive conjugated polymer complex is not critical and may vary widely. Suitable techniques are those described in U.S. Pat. Nos. 4,442,187 and 4,321,114. Such processes include the direct chemical polymerization of precursor molecules of the conjugated polymer as for example the molecules of Formula I in the presence of the dopant chemical species containing anions such as $R_1(SO_3^-)_r$ and $R_1(OPO_2^=)_r$. Also such processes include electrochemical doping of neutral conjugated polymer as described in U.S. Pat. No. 4,321,114. Another useful process is electrochemical polymerization of the precursor monomer of the conjugated polymer such as aniline and its derivatives as described in Formula I, in the presence of a dopant capable of producing anions in the doped polymer such as $R_1(SO_3^-)_c$ and $R_1(OPO_2^=)_r$ are described in Kobayaski, Tetsuhiko, et al., *J. Electroanal. Chem.*, "Electrochemical Reactions Concerned with Electrochromism of Polyaniline Film-Coated Electrodes", 77, pp. 28-29 (1984). Yet another process of forming the conjugated polymer of this invention involves the exchange of non-thermally stable dopants in the conjugated polymer with a suitable dopant anion such as $R_1(SO^-_3)_r$, $R_1(OPO^=_2)_r$ and/or $R_1(OPOH^-)_r$. For example, in this process, conjugated polymer can be doped by contacting same with a solution containing excess of a compound which ionizes in solution into a suitable dopant such as $R_1(SO^-_3)_rM^{+r}$, $R_1(OPO^=_2)_rM^{+2r}$ and $R_1(OPOH^-)M^{+r}$.

The conjugated polymer may be doped with a single dopant or with more than one dopant. When more than one dopant is used, the dopants of this invention are preferably structured in a core/skin arrangement with other dopants within the basic morphological unit of the conjugated polymer (fibril, globule, aggregate, and the like), or the dopants may be mixed throughout the unit. When the highest thermal stability is desired, it is generally preferred that the most thermally stable dopant anion be incorporated as the skin (surface) dopant. This skin preferably covers the smallest morphological unit accessible (the primary particle). When high dispersibility is required, the surface dopant anion is preferably an anion containing a long aliphatic moiety in which case the thermally stable anions of this invention are preferably incorporated in the core of said particles Another aspect of this invention relates to a composition comprising one or more thermally stable doped electrically conductive conjugated polymers of this invention, and one or more thermoplastic polymers, thermoset polymers or a combination thereof. One advantage of this composition is that because of the thermal stability of the electrically conductive conjugated polymer, articles can be fabricated from these compositions using conventional melt or heat processing techniques. Also, composites of these conjugated polymers can be used at temperatures higher then heretofore available to conductive conjugated polymers. The proportion of conjugated polymer to thermoplastic or thermoset polymer is not critical and may vary widely, depending on the use of the composition. For example, for those uses which require the composite having higher conductivities, i.e., up to or greater than about $10^0$ ohm$^{-1}$ cm$^{-1}$ the amount of electrically conductive conjugated polymer will tend to be relatively high, as for example greater than about 15 weight percent, based on the total weight of the composition. Conversely, for those uses in which lower conductivities are required, i.e., down to or less than about $10^{-6}$ ohm$^{-1}$cm$^{-1}$, the amount of electrically conductive polyaniline will tend to be relatively low, down to or less than about 5 weight percent based on the total weight of the composition. In the preferred embodiments of the invention, the amount of electrically conductive conjugated polymer is from about 1 to about 60 weight percent based on the total weight of the composition, and in the particularly preferred embodiments of the invention the amount of conductive conjugated polymer is from about 5 to about 40 weight percent on the aforementioned basis. Amongst these particularly preferred embodiments most preferred are those embodiments in which the composition comprises from about 5 to about 35 weight percent of the electrically conductive conjugated polymer based on the total weight of the composition.

In general, the amount of thermoplastic resin, thermosetting resin or combination thereof is from about 25 to about 99 wt % based on the total weight of the matrix. In the preferred embodiments of the invention, the amount of the resin(s) is from about 30 to about 99 wt % based on the total weight of the matrix. In the particularly preferred embodiments, the amount of resin(s) in the matrix is from about 50 to about 95 wt % based on the weight of matrix. In the most preferred embodiments of the invention, the amount of resin(s) in the matrix is from about 55 to about 70 wt % based on the total weight of the matrix.

Thermosetting resins useful in the practice of this invention may vary widely. Illustrative of useful thermosetting resins are alkyds such as those derived from esterification of polybasic acids, as for example, phthalic anhydride, fumaric acid, maleic anhydride, isophthalic acid, terephthalic acid, trimesic acid, hemimellitic acid, succinic anhydride, fatty acids derived from mineral or vegetable oils and the like, and polyhydric alcohols as for example glycerol, ethylene glycol, propylene glycol, and the like. Other useful thermosetting resins are acrylics such as crosslinkable polyacrylics, polyacrylates, epoxydiacrylates, urethane diacrylates and the like. Still other useful thermosetting resins are amino resins derived from reaction between formaldehyde and various amino compounds such as melamine, urea, aniline, ethylene urea, sulfonamide, dicyanodiamide and the like. Other useful thermosetting resins include urethanes derived from reaction of polyisocyanates or diisocyanates such as 2,6-tolylene diisocyanate, 2,4-tolylene diisocyanate, 4,4'-diphenylmethane diisocyanate, 4,4'-dicyclohexylmethane diisocyanate and the like, and polyols such as glycerin, ethylene glycol, diethylene glycol, and the like. Exemplary of still other thermosetting resins useful in the practice of this invention are unsaturated polyesters derived from reaction of dibasic acids such as maleic anhydride, fumaric acid, and the like, and dihydric alcohols such as ethylene glycol, propylene glycol, and the like; and silicones such as dimethyldichlorosilane and the like.

Yet another class of useful thermosetting resins are epoxies based on saturated or unsaturated aliphatic, cycloaliphatic, aromatic and heterocyclic epoxides. Useful epoxides include those based on glycidyl ethers derived from epichlorohydrin adducts and polyols, particularly polyhydric phenols. Another useful epoxide is the diglycidyl ether of bisphenol A. Additional examples of useful polyepoxides are resorcinol diglycidyl ether, 3,4-epoxy-6-methylcyclohexylmethyl-9,10-epoxystearate, pentaerythritol tetrakis(3,4-epoxycyclohexanecarboxylate), vinylcyclohexene dioxide, 3,9- bis(3,4-epoxycyclohexyl) spirobi-(methadioxane), and the like. Useful thermosetting resins also include phenolic resins produced by the reaction of phenols and aldehydes. Useful phenols include phenol, o-cresol, p-tert-butylphenol, p-tert-octylphenol, p-nonylphenol, 2,3-xylenol, resorcinol, bisphenol-A and the like. Useful aldehydes include formaldehyde, acetaldehyde, isobutyraldehyde, glyoxal, furfural and the like. Other useful thermosetting resins are aromatic vinylesters such as the condensation product of epoxide resins and unsaturated acids usually diluted in a compound having double bond unsaturation such as vinylaromatic monomer as for example styrene and vinyltoluene, and diallyl phthalate. Illustrative of useful vinylesters are diglycidyl adipate, diglycidyl isophthalate, di-(2,3-epoxybutyl) adipate, di-(2,3-epoxybutyl) oxalate, bisphenol-A-fumaric acid polyester and the like.

Preferred thermosetting resins for use in the practice of this invention are vinyl esters, unsaturated polyesters, epoxies and phenolics. Particularly preferred thermosetting resins are vinyl esters, epoxies and phenolics, with vinylesters being the thermosetting resin of choice.

Thermoplastic polymers for use in the formulation of the composition of this invention may vary widely. Illustrative of such polymers are polyesters such as poly(pivaloyl lactone), poly(para-hydroxybenzoate), poly(ethylene oxybenzoate), poly(ethylene terephthalate), poly(1,4-cyclohexane dimethylene terephthalate), and the like; polyamides such as poly(4-aminobutyric acid) (nylon 4), poly(6-amino-hexanoic acid) (nylon 6), poly(12-aminododecanoic acid) (nylon 12), poly(hexamethylene adipamide) (nylon 6,6), poly(hexamethylene sebacamide), (nylon 6,10), poly[bis(4-aminocyclohexyl)-methane-1,10-decanedicarboxamide] (Quiana)(trans), poly(metaphenylene isophthalamide) (Nomex), poly(p-phenylene terephthalamide) (Kevlar), and the like; polycarbonates such as poly[methane bis(4-phenyl)carbonate], poly[1,1-ethane bis(4-phenyl)carbonate], poly[2,2-propane bis(4-phenyl)carbonate], and the like; polymers derived from the polymerization of $\alpha,\beta$-unsaturated monomers such as polyethylene, acrylonitrile/butadiene/styrene terpolymer, polypropylene, poly(4-methyl-1-pentene), polyisobutylene, poly(isoprene), 1,2-poly(1,3-butadiene) (isotatic), 1,2-poly(-butadiene) (syndiotatic), polystyrene, poly(vinyl chloride), poly(vinylidene fluoride), poly(vinylidene chloride), poly(tetrafluoroethylene) (Teflon), poly(chlorotri-fluoroethylene), poly(vinyl alcohol), poly(methyl acrylate), poly(ethyl acrylate), poly(methyl methacrylate), polyacrylonitrile, polyacrylamide, and the like; polydienes such as poly(1,3-butadiene) (cis), poly(1,3-butadiene) (trans), poly(1,3-butadiene) (mixt.), (cis), and the like; polyoxides such as poly(ethylene oxide), poly[2,2-bis(chloromethyl)-trimethylene-3-oxide](penton), poly(2,6-dimethyl-1,4-phenylene oxide) (PPO), poly(2,6-diphenyl-1,4-phenylene oxide) (Texax, P30), and the like; polysulphides such as poly(propylene sulphide), poly(phenylene sulphide) and the like; polysulfones such as poly[4,4'-isopropylidene diphenoxy di(4-phenylene) sulphone]; noryl; polyphenylene sulfides; and mixtures thereof.

In the preferred embodiments of the invention, the non-conductive homopolymer or copolymer is a thermoplastic homopolymer or copolymer. Preferred thermoplastic polymers are polyamides, polyesters, poly(carbonates), poly($\alpha$-olefins), poly(vinyls), and polysulfones.

More preferred thermoplastic homopolymer or copolymers are polyamides, polycarbonate, polyesters, poly($\alpha$-olefin), polyvinyls and halogenated poly($\alpha$-olefins), and most preferred thermoplastic polymers are poly(ethylene terephthalate), nylon-6, nylon-6,6, nylon-12, poly(vinylchloride), poly(chlorotrifluoro ethylene), polyethylene terephthalate glycol, polyethylene, polypropylene, and acrylonitrile/butadiene/styrene terpolymer (ABS).

In the particularly preferred embodiments of the invention the preferred thermoplastic material is a polyurethane. The composition of this invention may include various optional components such as plasticizers, blending aids, colorants, flame-retardants and the like, or components which either fill or form a substrate for the composition to be cast from the melt or solution. These other components may vary widely and may include any material known for use in conventional polymer compositions. Illustrative of such other components are such material as carbon, metal conductors, reinforcing fibers, inert fillers, glass beads, clays, other conductive and non-conductive polymers, conductive ceramics, super-conductive ceramics, and the like.

The composition of this invention can be prepared using conventional techniques as for example conventional melt or solution blending techniques. For example, such compositions can be formed by heating and mixing a mixture of the various components to a temperature which is equal to or greater than the melting point or flow point of at least one of the polymer components to form a molten intimate mixture to which optional components may be added as desired. Thereafter the mixture can be formed into a desired article through use of any conventional shape forming technique. For example, the molten mixture can be formed into a desired article through use of any conventional shape forming technique. For example, the molten mixture can be spread on a surface and allowed to cool forming free standing films or coatings. The molten mixture can be extruded through a die to form films or fibers, or injection molded into a suitable mold to form molded parts having the shape of the mold. The manner in which the molten mixture is formed is not critical and conventional methods can be employed. For example, the molten mixture can be formed through use of conventional polymer and additive blending means, in which the polymeric components are heated to a temperature equal to or greater than the melting point of at least one of the polymers, and below the degradation temperature of each of the polymers. Ultrasonification can be used to improve dispersion of the non-soluble phases. The desired amount of the optional ingredients in a liquid or powdered from is added to the melted polymers while at the same time vigorously agitating the melt as for example by stirring or irradiating with ultrasound, or added prior to melting and mixing.

In a solution process for the preparation of the composition of this invention a solution of the desired host polymer in a suitable solvent with or without a dopant solute is formed. The desired optional components in the desired amounts may be dissolved or dispersed in the solution. The dissolved and/or dispersed polymers can be solidified into a desired shape by removal of the solvent through use of conventional techniques. For example, by removal of the solvent from a solution spread on a surface, films can be formed of any desired thickness. By extruding the solution through a die, fibers and films can be made. Similarly, by removing the solvent from the solution in a mold, shaped articles conforming in shape to the mold can be prepared. If the original solution did not include a suitable dopant, the shaped article can be exposed to a suitable dopant to dope the polyaniline. In the preferred embodiments of the invention, however, doped polyaniline is used to form the solution.

In the most preferred embodiment, the components of the mixture can be granulated, and granulated components mixed dry in a suitable mixer, as for example using ultrasonification or a tumbler or a Branbury Mixer, or the like, as uniformly as possible. Thereafter, the composition is heated and further mixed in an extruder when at least one of the polymers components is melted. As described above, the fluid mixture is thereafter ejected with cooling.

The electrically conductive conjugated polymer composition of this invention can be used for any purposes for which conductive polymers are useful. For example, the composition can be used to form electrically conductive articles of manufacture for shielding purposes, anti-static purposes or adhesive. Examples of articles include conductive polymer housings for EMI Shielding of sensitive electronic equipment such as microprocessors, infrared, radio frequency and microwave absorbing shields, flexible electrically conducting connectors, conductive bearings, brushes and semiconducting photoconductor junctions, electrodes, capacitors, optically transparent or non-transparent corrosion-preventing coatings for corrodible materials such as steel, antistatic materials and optically transparent or non-transparent coatings for packaging electronic components, antistatic carpet fibers, waxes for floors in computer rooms, antistatic finishes for CRT screens, aircraft, auto windows, electrostatic dissipative packaging for electronics, and the like.

The following specific examples are presented to more particularly illustrate the invention, and should not be construed as being limitations on the scope and spirit of the invention.

EXAMPLE 1

Polyaniline tosylate (PAni OTs) was prepared from aniline, p-toluene sulfonic acid (PTSA or tosylic acid), and ammonium persulfate solution by first combining the aniline and the acid, and then slowly adding the ammonium persulfate solution to the acid and aniline solution in approximately one hour. The solids which were formed were then filtered and washed successively three times with water, once with 10% solution of PTSA, and finally with a 2% solution of PTSA in methanol. After filtering the solids were dried in a vacuum oven at 130° C. until the temperature of the powdered solids reached 100° C. The water content of the solids was determined to be less than 3% by weight.

EXAMPLE 2

Polyaniline tosylate was prepared as in Example 1 with the exception that the solids were filtered and washed successively three times with hot water (70° C.) and the final washes containing PTSA were eliminated. The filter cake was not dried but kept saturated with water. Elemental analysis determined that the molar ratio of sulfur to nitrogen was 0.30, compared with a theoretical maximum of 0.50. This partially undoped polyaniline tosylate was retained for further redoping studies.

EXAMPLE 3

Polyaniline tosylate particles were redoped preferentially on their surface with dopants other than tosylic acid to produce a skin/core dopant profile within each particle, particle aggregate, and/or primary particle. The filter cake of Example 2 was reslurried in a solution of an acid other than tosylic acid with the aid of a high speed homogenizer. In successive experiments, acid solutions having a pH of approximately 1 were prepared from benezene sulfonic acid (BZSA), 4-hydroxybenezene sulfonic acid (HBSA), biphenyl p-sulfonic acid (BPSA), 1,5-naphthalene disulfonic acid (N15SA), 2,6 naphthalene disulfonic acid (N26SA), 1-naphthol 3,6-disulfonic acid (H1N36SA), 2,5 dihydroxybenezene 1,4-disulfonic acid (H25B14SA), 3,6-dihydroxy naphthalene 2,7-disulfonic acid (H36N27SA), 6-amino-4-hydroxynapthalene sulfonic acid (6A4HNSA), 3-hydroxy-1-propane sulfonic acid (HPSA), and a random polymeric sulfonate with average molecular weight of approximately 900 with the following structure (HPSSA):

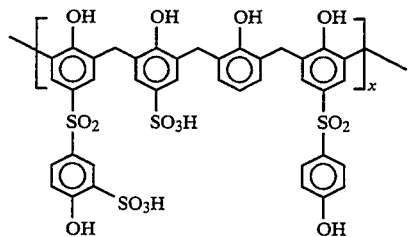

The suspension of the polyaniline tosylate was stirred in successive preparations in one of the above acids for one hour at 50° C. The suspension was then allowed to cool while stirring for a minimum of an additional 3 hours. This procedure was found to nearly completely exchange the tosylic acid originally present for the new acid. The solids were filtered and a methanol solution of the given acid was then added and the mixture was stirred for an additional 0.5 h. Elemental analysis for the sulfur to nitrogen ratio of the polyaniline produced is summarized in Table 1 below. Typical water content of the samples was found to be 1 to 5 percent by weight.

| POLYANILINE | S/N MOLAR RATIO |
|---|---|
| PAni OTs | 0.48 |
| PAni BZS | 0.495 |
| PAni BPS | 0.461 |
| PAni N15S | 0.419 |
| PAni N26S | 0.453 |
| PAni HBS | 0.527 |
| PAni H1N36S | 0.410 |
| PAni H25B14S | 0.401 |
| PAni H36N27S | 0.436 |
| PAni 6A4HNS | 0.324 |
| PAni HPS | 0.455 |
| PAni HPSSA | 0.396 |

*from Example 1

EXAMPLE 4

The relative thermal stabilities of the various forms of polyaniline, described in Examples 1 to 3 above, were determined by the following procedure: The powdered polyaniline was compressed into pellets with a diameter of 0.7 cm and a thickness of about 0.09 cm. The pellets were placed in an apparatus in which the given pellet was contacted by gold pins at four equally spaced points (90 degrees apart) near the circumference of the pellet. In this configuration a four-probe resistance measurement could be made which could be used to calculate the bulk conductivity of the pellet from the equation $s=0.215/(Rd)$, where s is conductivity in S/cm (or $ohm^{-1}cm^{-1}$), R is resistance in ohms, and d is pellet thickness in cm. The pellet was maintained in an atmosphere of flowing nitrogen and was held at various constant temperatures (130° C., 150° C., 170° C., 200° C., and 230° C.) while the conductivity was observed to decay. In order to insure that all samples were thoroughly dry, the pellets were first held at 150° C. for 16 hours before conductivity data were taken. All of the samples exhibited a decay in conductivity as an exponential function of time at a given temperature which could be described by the relation, $$s(t)=s_0 e^{-(t/\tau)60}$$

where s(t) is the conductivity at a time, t; $s_0$ is the initial conductivity at time t=0; $\tau$ is an experimentally determined characteristic decay time; and the exponent $\alpha$ is an experimentally determined parameter for a given sample at each temperature. The value of $\alpha$ typically lay in a range from 0.77 to 1.0. With the help of this equation a characteristic half-life of the conductivity can be determined at each temperature from the value of $\tau$ and $\alpha$ determined at that temperature according to the relation, $$t_{\frac{1}{2}}=\tau(ln2)^{1/\alpha}$$

where ln is the naperian logarithm and $t_{\frac{1}{2}}$ is the time required for the conductivity to decrease by half (half life). Since the determination of $\tau$ and $\alpha$ can be made from the functional form of the decay at early times, this method does not require that the conductivity be driven down to one half its original value at each temperature. As a result, this method allows the determination of the half lives at the five temperatures listed above on the same sample without unduly altering the thermal decay characteristics of the sample by heavily degrading the sample at each temperature.

The data for the half lives taken as, described above at 130° C., 150° C., 170° C., 200° C., and 230° C. was shown to follow an Arrhenius exponential as a function of temperature (T) of the form, $$t_{\frac{1}{2}}=(t_{\frac{1}{2}})_0 e^{Ea/KT}$$

where e is the base of the naperian logarithm and K is the Boltzmann constant. The activation energy, $E_a$, was determined from the slope of a plot of $\ln[t_{\frac{1}{2}}]$ vs the inverse of absolute temperature in degrees Kelvin. The naperian logarithm of the prefactor, $\ln[(t_{\frac{1}{2}})_0]$, was determined from the intercept at $1/T=0$. These empirically determined parameters were then used to predict the thermal stability (i.e., the conductivity half life) over a range of temperature extending from 50° C. to about 280° C. These data were used to estimate an upper limit for processing temperature ($T_p$) and for continuous use temperature ($T_u$). Temperatures corresponding to maximum processing times of 0.1 h, 1.0 h and 3 h were calculated along with the temperatures where the continuous use time was 5 years. Table II below summarizes the results obtained for the various compositions which were tested.

In Table II, the following abbreviations are used:
(a) "BPS" is biphenylsulfonate,
(b) "BZS" is benzenesulfonate,
(c) "HBS" is 4-hydroxybenzenesulfonate,
(d) "NDS" is naphthalene disulfonate,
(e) "H1N36S is 1-naphthol 3,6-disulfonate,
(f) "HPSS" is partially sulfonated polymer containing methylene-linked phenol and diphenol sulfone groups,
(g) "PDPES" is methylene-linked polymer of diphenyl ether 4-sulfonate,
(h) "DPEDS" is diphenyl ether 4,4 '-disulfonate,
(i) "2AO" is dodecyldiphenyl ether disulfonate (DOWFAX 2AO).
(j) "4CLBS" is 4-chlorobenzene sulfonate.
(k) "H25B14S" is 2,5-dihydroxybenzene 1,4-disulfonate.
(l) "H45N27S" is 3,6-dihydroxynaphthalene 2,7-disulfonate.
(m) "4SPHTH" is 4-Sulfophthalate.
(n) "5SSAL" is 5-sulfosalicylate.
(o) "PAni" is polyaniline in its approximately half oxidized (emeraldine) form.

Dopant compositions listed for example, as OTs/-2AO, denote compounds synthesized as in Example 3 which originally possessed tosylate (OTs) dopant anions which have been exchanged for other dopant anions, e.g. 2AO. The conductivity, $S_o$, listed in the table is the conductivity measured at 150° C. after the sample has been initially dried in the apparatus at 150° C. under flowing nitrogen for about 16 hours.

TABLE III

USE TEMPERATURE AND PROCESSING TEMPERATURES OF POLYANILINE COMPOSITIONS

| Composition | $S_o$ (S/cm) | $T_u(5y)$ (C) | $T_P(0.1\ h)$ (C) | $T_P(1\ h)$ (C) | $T_P(3\ h)$ (C) |
|---|---|---|---|---|---|
| I Alkylaryloulfonates | | | | | |
| PAni OTs | 5.4 | 97 | 239 | 206 | 192 |
| II Multi-sulfonated Aryl | | | | | |
| PAni OTs/2AO | 1.3 | 102 | 257 | 221 | 205 |
| PAni OTE/PDPES | 0.7 | 84 | 247 | 209 | 192 |
| *PAni OTs/HPSS | 1.2 | 98 | 259 | 221 | 205 |
| PAni OTs/DPEDS | 3.4 | 94 | 264 | 223 | 206 |
| PAni OTs/N15DS | 2.4 | 112 | 280 | 239 | 222 |
| PAni OTs/N26DS | 2.5 | 104 | 286 | 242 | 224 |
| *PAni OTs/H25B14S | 5.2 | 105 | 264 | 227 | 211 |
| *PAni OTs/H36N27S | 4.5 | 107 | 252 | 218 | 204 |
| *PAni OTs/H45N27S | 2.5 | 91 | 268 | 225 | 207 |
| *PAni OTs/H1N36S | 2.6 | 79 | 300 | 243 | 219 |
| III Arylsulfonates | | | | | |
| PAni OTs/BPS | 1.3 | 95 | 241 | 207 | 192 |
| PAni OTs/BZS | 5.3 | 99 | 256 | 219 | 203 |
| PAni OTs/s4CLBS | 8.3 | 107 | 254 | 220 | 206 |
| *PAni OTs/4SPHTH | 2.6 | 106 | 269 | 230 | 214 |
| *PAni OTs/5SSAL | 9.0 | 128 | 251 | 224 | 212 |
| *PAni OTs/HBS | 12.8 | 118 | 263 | 230 | 216 |

*Compositions containing one or more hydroxy substituents

Table II illustrates the enhancement in both conductivity and thermal stability which can be achieved via the addition of a hydrogen bonding group such as hydroxyl. For example, in comparison with polyaniline doped with unsubstituted benzene sulfonic acid (PAni OTs/BZs), the addition of a hydroxyl group in the para position (PAni OTs/HBs) greatly enhanced both conductivity and thermal stability. In contrast, the addition of a non-hydrogen-bonding group such as methyl (PAni OTs) was shown to reduce thermal stability. Addition of polar groups which have only weak hydrogen bonding capability (e.g., PAni OTs/4CLBS) enhanced conductivity but had only a slight beneficial effect on thermal stability. Hydrogen bonding groups other than hydroxyl (for example, carboxylic acid groups present in PAni OTs/4SPHTH) were also shown to provide significant improvements in thermal stability.

Results with the addition of hydroxyl to disulfonic acids were less dramatic (c.f., PAni OTs/N26DS vs PAni OTs/H36N27S) and showed an increase in conductivity and even a decrease in thermal stability in many cases (with the exception of PAni OTs/H1N36S). While we do not wish to be bound by any theory, this result may be taken to illustrate the potential for multiple hydrogen bonding groups (in the present instance sulfonate and hydroxyl) to bond internally and therefore, to a lesser extent with the polymer. Further illustration of this effect was obtained by comparing the results for PAni OTs/H36N27S with those for PAni OTs/H45N27S. In the latter case, the hydroxyl groups are further removed from the sulfonate sites which was expected to reduce internal interactions within the dopant anion and did lead to an enhanced thermal stability at high temperature. The best thermal stability was obtained with a single hydroxyl group far removed from the sulfonate sites (PAni OTs/H1N36S).

What is claimed is:

1. An electrically conductive conjugated polymer composition comprising a substituted or unsubstituted conjugated polymer which comprises at least one hydrogen bonding group, said polymer doped with a dopant to provide a complex comprising a positively charged polymer cation and a negatively charged dopant anion, said anion substituted with at least one anionic functionality and substituted with at least one substituent selected from the group consisting of hydrogen bonding groups.

2. A composition according to claim 1 wherein said conjugated homopolymer or copolymer is a conjugated backbone homopolymer or copolymer.

3. A composition according to claim 2 wherein said conjugated backbone or homopolymer is a substituted or unsubstituted polyaniline.

4. A composition according to claim 3 wherein said polyaniline is derived from polymerizing an aniline of the Formula I:

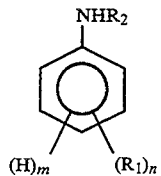

Formula I or is a derivative of a polyaniline derived from polymerizing said aniline, wherein:

n is an integer from 0 to 5;

m is an integer from 0 to 5, with the proviso that the sum of n and m is 5 with the further proviso that at least one position on the aniline ring is substituted with a substituent which will allow coupling of aniline groups to form the polyaniline;

$R_1$ is the same or different at each occurrence and is phosphinic acid or a salt or an ester thereof, phosphonic acid or a salt or an ester thereof, sulfonic acid or a salt or an ester thereof, boric acid or a salt or an ester thereof, phosphoric acid or a salt or an ester thereof, sulfinic acid or a salt or an ester thereof, alkylamino, dialkylamino, arylamino, diarylamino, alkylarylamino, amino, hydoxy, nitro, carboxylic acid or a salt or an ester thereof, halo, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, aryloxyalkyl, hydroxy, alkylthioalkyl, alkylaryl, arylalkyl, amino, alkylsulfinyl, alkoxyalkyl, alkylsulfonyl, aryl, arylthio, arylsulfinyl, alkoxycarbonyl, alkylsilane, or arylsulfonyl, wherein $R_1$ is from 1 to about 30 carbon atoms and wherein substituents are one or more amino, alkylamino, dialkylamino, arylamino, diarylamino, phosphinic acid or a salt or an ester thereof, alkylarylamino, phosphonic acid or a salt or an ester thereof, sulfonic acid or a salt or an ester thereof, boric acid or a salt or an ester thereof, sulfinic acid or a salt or an ester thereof, phosphoric acid or a salt or an ester thereof, carboxylic acid or a salt or an ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9, or 10 membered aromatic. heteroalicyclic, heteroaromatic or alicyclic carbon ting, which ring may optionally include one or more divalent ester, carbonyl, nitrogen, sulfur, sulfinyl or salts or esters thereof, sulfonyl or oxygen, wherein substituents are one or more amino, alkylamino, phosphinic acid or a salt or an ester thereof, dialkylamino, arylamino, diarylamino, alkylarylamino, phosponic acid or a salt or an ester thereof, sulfonic acid or a salt or an ester therof, boric acid or a salt or an ester thereof, sulfinic acid or a salt or an ester thereof, phosphoric acid or a salt or an ester thereof, carboxylic acid or a salt or an ester thereof, halo, nitro, hydroxy, cyano or epoxy moieties; or $R_1$ is an aliphatic moiety having repeat units of the formula:

$(OCH_2CH_2)_qO$—$CH_3$, $(OCH_2CH(CH_3))_qO$—$CH_3$, $(CH_2)_qCF_3$, $(CF_2)_qCF_3$ or $(CH_2)_qCH_3$ wherein q is a positive whole number; and
$R_2$ is the same or different at each occurrence and is $R_1$ substituents or hydrogen.

5. A composition according to claim 4 wherein n is 0 to 4 and m is 1 to 5.

6. A composition according to claim 3 wherein the polyaniline comprises repeat units of the Formulas II and III:

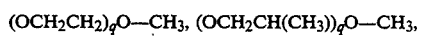

Formula II

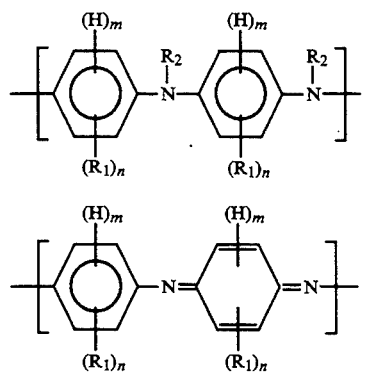

Formula III or a combination thereof, wherein:
n and m are the same or different at each occurrence and are integers from 0 to 5, with the proviso that the sum of n and m is 5 and with the further proviso that at least one position on the aniline ring is substituted with a substituent which will allow coupling of the aniline groups to form the polyaniline;
$R_1$ is the same or different at each occurrence and is phosphinic acid or a salt or an ester thereof, phosphonic acid or a salt or ester thereof, sulfonic acid or a salt or an ester thereof, boric acid or a salt or an ester thereof, phosphoric acid or a salt or an ester thereof, sulfinic acid or a salt or an ester thereof, alkylamino, dialkylamino, arylamino, diarylamino, alkylarylamino, amino, hydoxy, nitro, carboxylic acid or a salt or an ester thereof, halo, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, aryloxyalkyl, hydroxy, alkylthioalkyl, alkylaryl, arylalkyl, amino, alkylsulfinyl, alkoxyalkyl, alkylsulfonyl, aryl, arylthio, arylsulfinyl, alkoxycarbonyl, alkylsilane, or arylsulfonyl, wherein $R_1$ is from 1 to about 30 carbon atoms and wherein substituents are one or more amino, alkylamino, dialkylamino, arylamino, diarylamino, phosphinic acid or a salt or an ester thereof, alkylarylamino, phosphonic acid or a salt or an ester thereof, sulfonic acid or a salt or an ester thereof, boric acid or a salt or an ester thereof, sulfinic acid or a salt or an ester thereof, phosphoric acid or a salt or an ester thereof, carboxylic acid or a salt or an ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9, or 10 membered aromatic. heteroalicyclic, heteroaromatic or alicyclic carbon ring, which ring may optionally include one or more divalent ester, carbonyl, nitrogen, sulfur, sulfinyl or salts or esters thereof, sulfonyl or oxygen, wherein substituents are one or more amino, alkylamino, phosphinic acid or a salt or an ester thereof, dialkylamino, arylamino, diarylamino, alkylarylamino, phosponic acid or a salt or an ester thereof, sulfonic acid or a salt or an ester therof, boric acid or a salt or an ester thereof, sulfinic acid or a salt or an ester thereof, phosphoric acid or a salt or an ester thereof, carboxylic acid or a salt or an ester thereof, halo, nitro, hydroxy, cyano or epoxy moieties; or $R_1$ is an aliphatic moiety having repeat units of the formula:

$(OCH_2CH_2)_qO$—$CH_3$, $(OCH_2CH(CH_3))_qO$—$CH_3$, $(CH_2)_qCF_3$, $(CF_2)_qCF_3$ or $(CH_2)_qCH_3$ wherein q is a positive whole number; and
$R_2$ is the same or different at each occurrence and is $R_1$ substituents or hydrogen.

7. A composition according to claim 3 wherein said polyaniline is comprised of the Formula IV:

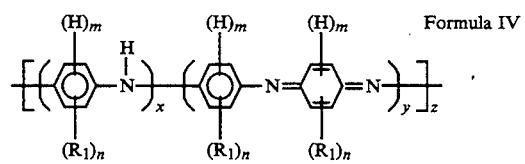

Formula IV wherein:
x and y are the same or different at each occurrence and are integers equal to or greater than 0, with the proviso that the sum of x and y is greater than 0;
z is an integer equal to or greater than about 5;
n is an integer from 0 to 5;
m is an integer from 0 to 5, with the proviso that the sum of n and m is 5; and with the further proviso that at last one position on the aniline ring is substituted with a substituent which will allow coupling of aniline to form polyaniline;

$R_1$ is the same or different at each occurence and is phosphinic acid or a salt or an ester thereof, phosphonic acid or a salt or an ester thereof, sulfonic acid or a salt or an ester thereof, boric acid or a salt or an ester thereof, phosphoric acid or a salt or an ester thereof, sulfinic acid or a salt or an ester thereof alkylamino, diallkylamino, arylamino, diarylamino, alkylarylamino, amino, hydoxy, nitro, carboxylic acid or a salt or an ester thereof, halo, cyano, deuterium, or substituted or unsubstituted alkyl, alkenyl, alkoxy, cycloalkyl, cycloalkenyl, alkanoyl, alkylthio, alkynyl, dialkylamino, arylamino, diarylamino, alkylarylamino, aryloxy, aryloxalkyl, hydroxy, alkylthioalkyl, alkylaryl, arylalkyl, amino, alkylsulfinyl, alkoxyalkyl, alkylsulfonyl, aryl, arylthio, arysulfinyl, alkoxycarbonyl, alkylsilane, or arylsulfonyl, wherein $R_1$ is from 1 to about 30 carbon atoms and wherein substituents are one or more amino, alkylamino, dialkylamino, arylamino, diarylamino, phosphinic acid or a salt or an ester thereof, alkylarylamino, phosphonic acid or a salt or an ester thereof, sulfonic acid or a salt or an ester thereof, boric acid or a salt or an ester thereof, sulfinic acid or a salt or an ester thereof, phosphoric acid or a salt or an ester thereof, carboxylic acid or a salt or an ester thereof, halo, nitro, hydroxy, cyano or epoxy moieties; or any two $R_1$ substituents or any one $R_1$ substituent and $R_2$ substituent taken together may form substituted or unsubstituted alkylene, alkynylene or alkenylene chain completing a 3, 4, 5, 6, 7, 8, 9, or 10 membered aromatic. heteroalicyclic, heteroaromatic or alicyclic carbon ring, which ring may optionally include one or more divalent ester, carbonyl, nitrogen, sulfur, sulfinyl or salts or esters thereof, sulfonyl or oxygen, wherein substituents are one or more amino, alkylamino, phosphinic acid or a salt or an ester thereof, dialkylamino, arylamino, diaryamino, alkylarylamino, phosponic acid or a salt or an ester thereof, sulfonic acid or a salt or an ester therof, boric acid or a salt or an ester thereof, sulfinic acid or a salt or an ester thereof, phosphoric acid or a salt or an ester thereof, carboxylic acid or a salt or an ester thereof, halo, nitro, hydroxy, cayano or epoxy moieties; or $R_1$ is an aliphatic moiety having repeat units of the formula:

$(OCH_2CH_2)_qO-CH_3$, $(OCH_2CH(CH_3))_qO-CH_3$, $(CH_2)_qCF_3$, $(CF_2)_qCF_3$ or $(CH_2)_qCH_3$ wherein q is a positive whole number; and
$R_2$ is the same or different at each occurrence and is $R_1$ substituents or hydrogen.

8. A composition according to claim 7 wherein $R_2$ is hydrogen.

9. A composition according to claim 8 wherein m is 3 or 4 and n is 0 or 1.

10. A composition according to claim 9 wherein $R_1$ is the same or different at each occurrence and is alkyl or alkoxy having from 1 to about 12 carbon atoms or a protonic acid function or a salt thereof.

11. A composition according to claim 10 wherein $R_1$ is the same or different at each occurrence and is alkyl or alkoxy having from 1 to about 6 carbon atoms or sulfonic acid or salt thereof.

12. A composition according to claim 11 wherein:
x is an integer equal to or greater than 1;
y is equal to or greater than 0; and
z is an integer equal to or greater than about 5.

13. A composition according to claim 12 wherein:
x and y are integers equal to or greater than 1 with the proviso that the ratio of x to y is equal to or greater than 1; and
z is an integer equal to or greater than 5.

14. A composition according to claim 13 wherein:
m is 4 and n is 0;
x and y are integers equal to or greater than 1 with the proviso that the ratio of x to y is equal to about 2; and
z is an integer equal to or greater than about 10.

15. A composition according to claim 12 wherein said dopant anions are organic species of the formulas:

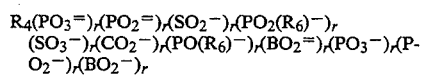

wherein:
$R_6$ and $R_4$ are the same or different and are organic radicals with the proviso that $R_4$ is substituted with a hydrogen bonding group; and
r is 0 or an integer of from 1 to 8, with the proviso that at least one r is not 0.

16. A composition according to claim 15 wherein said dopant anions are derived from organic acid dopants having anionic moieties of the formulas:

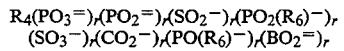

and having a cationic moieties of the Formula:

wherein at least one of the cationic moieties of the formula $M^{+s}$ is a proton or is a moiety which can be thermally or chemically transformed into a proton;
$M^{+s}$ is a cationic species having a positive charge s;
s is an integer equal to or greater than 1;
$R_4$ and $R_6$ are the same or different and are organic radicals, with the proviso that $R_4$ is substituted with at least one hydrogen bonding group; and
r is the same or different and is an integer equal to or greater than 0 with the proviso that at least one r is greater than 0; preferably from 0 to about 8.

17. A composition according to claim 16 wherein said dopants are acids or acid derivatives of the formula:

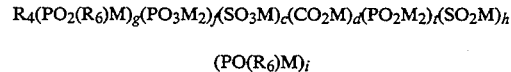

or

-continued

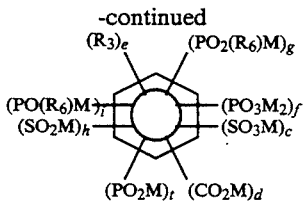

wherein:
M is H⁺, or other metal or non-metal cation with the proviso that at least one of M is H⁺ or a moiety which can be thermally or chemically transformed into a proton;
t is 0, 1, 2, 3 or 4;
h is 0, 1, 2, 3 or 4;
i is 0, 1, 2, 3 or 4;
c is 0, 1, 2, 3 or 4;
d is 0, 1, 2, 3 or 4;
f is 0, 1, 2, 3 or 4;
g is 0, 1, 2, 3 or 4, with the proviso that at least one of c, d, f, g, h, i or t is other than 0;
e is 0, 1 or 2;
$R_4$ is a hydrogen bonding group selected from the group consisting of aryl, alkylthio, alkoxycarbonyl, alkylcarbonyl, carbonyl, alkylcarbonylalkyl, alkylsulfinylalkyl, hydroxy, alkylsulfonylalkyl, alkylaminoalkyl, alkylamino, dialkylamino, alkylarylamino, (alkyl)arylamino, halo, di(alkyl)arylamino, alkylthioalkyl, amino, alkylarylamino, alkoxy, alkylaryl, aryloxy, alkylsulfinyl, alkylsulfonyl, dialkylaminoalkyl, aryloxyalkyl, aryloxyalkoxy, alkoxyaryl, alkylaryloxy, alkoxyaryloxy and is alkyl or arylalkyl substituted with one or more of said hydrogen bonding groups or one or more sulfinic acid or a salt or an ester thereof, sulfonic acid or a salt or an ester thereof, phosphonic acid or a salt or an ester thereof, phosphinic acid or a salt or an ester thereof, phosphoric acid or a salt or an ester thereof, carboxylic acid or a salt or an ester thereof, or boric acid or a salt or an ester thereof;
$R_5$ is the same or different at each occurrence and is a hydrogen bonding group selected from the group consisting of hydroxy, halo, amino, carbonyl or substituted or unsubstituted alkoxycarbonyl, alkylcarbonyl, alkylcarbonylalkyl, alkylsulfinylalkyl, alkylsulfonylalkyl, alkylaminoalkyl, alkylamino, dialkylamino, aryloxy, alkylarylamino, (alkyl)arylamino, di(alkyl)arylamino, alkylaryl, alkylthioalkyl, alkylarylamino, alkoxy, alkoxyalkyl, alkylaryl, aryloxy, alkylsulfinyl, alkylthio, alkylsulfonyl, dialkylaminoalkyl, aryloxyalkyl, aryloxyalkoxy, alkoxyaryl, alkylaryloxy or alkoxyaryloxy or substituted alkyl, wherein substituents are one or more sulfinic acid or a salt or an ester thereof, sulfonic acid or a salt or an ester thereof, phosphonic acid or a salt or an ester thereof, phosphinic acid or a salt or an ester thereof, phosphoric acid or a salt or an ester thereof, carboxylic acid or a salt or an ester thereof, or boric acid or a salt or an ester thereof, or any two or more $R_5$ substituents together may form an alkylene or alkenylene chain completing a ring system such as a fused or spiro ring system which may include one or more cyclic rings, which chain is substituted with one or more of said hydrogen bonding groups, sulfonic acid or a salt or an ester thereof, sulfinic acid or a salt or an ester thereof, phosphonic acid or a salt or an ester thereof, phosphinic acid or a salt or an ester therof, phosphoric acid or a salt or an ester thereof, carboxylic acid or a salt or an ester thereof, or boric acid or a salt or an ester thereof, or $R_5$ is a moiety of the formula:

—(OCH₂CH₂)$_q$OCH₃ or
—(OCH₂CH(CH₃))$_q$OCH₃ wherein:
q is a positive whole number from 6 to about 12 or alkyl substituted with said moiety; with the proviso that $R_4$ is substituted with one or more hydrogen bonding groups; and
$R_6$ is hydrogen, alkyl, aryl, alkylaryl, aryloxy, arylalkoxy, alkylsulfinyl, alkylthio, alkylsulfonyl, or alkoxy; provided that $R_4$, $R_5$, and $R_6$ are each independently from 1 to about 30 carbon atoms.

18. A composition according to claim 17 wherein said dopants are acids and/or acid derivatives of the formula:

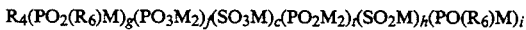

or

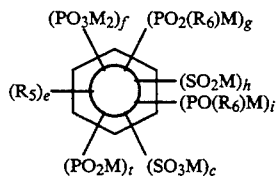

wherein:
c, t, f, g, h and i are the same or different at each occurence and are 0, 1, 2, or 3, with the proviso that at least one of c, d, t, f, g, i or h is other than 0;
e is 1 or 2;
$R_4$ is substituted alkyl wherein substituents are hydrogen bonding groups selected from the group consisting of carbonyl, carboxylic acid or a salt thereof, carbon, hydroxy, alkoxy, halo, phenyl, phenoxy, phenyl or phenoxy substituted with one or more alkyl, alkoxy, carbonyl, carboxylic acid, carbonate salt, hydroxy sulfonic acid, sulfonate salt, haloalkyl, perhaloalkyl, alkylthio or alkylthioalkyl;
$R_5$ is the same or different at each occurrence and is a hydrogen bonding group selected from the group consisting of alkoxyalkyl, alkoxy, halo, phenol, hydroxy, carbonyl, carboxylic acid or a salt thereof, phenyl or phenoxy substituted with one or more, alkoxy, sulfo, alkoxyalkyl, halo, hydroxy, sulfonic acid or a salt thereof, alkylsulfinyl, alkylsulfonyl, alkylsulfinylalkyl, alkylsulfonylalkyl, carboxylic acid or a salt thereof, alkylthio or alkylthioalkyl substituents or any two $R_5$ substituents together may form substituted alkylene or alkenylene chain chain completing an aromatic or an alcyclic ring system wherein substituents are the aforesaid hydrogen bonding groups, sulfinic acid or a salt thereof, sulfonic acid or a salt thereof, phosphonic acid or a salt thereof, or phosphinic acid or a salt thereof, or $R_5$ is a moiety of the formula:

—(OCH$_2$CH$_2$)$_q$OCH$_3$ or
—(OCH$_2$CH(CH$_3$))$_q$OCH$_3$ wherein:

q is a positive whole number from 6 to about 12;

R$_6$ is hydrogen, alkyl, alkoxy or substituted or unsubstituted phenoxy, phenyl or phenylalkyl wherein substituents are alkyl, alkoxy or a combination thereof; provided that R$_4$, R$_5$, and R$_6$ are each independently from 1 to about 30 carbon atoms; and M is H$^+$, or other metal or non-metal cation, with the proviso that at least one of M is H$^+$ or a moiety which can be thermally or chemically transformed into a proton.

19. A composition according to claim 18 wherein said dopants are acids and/or acid derivatives of the formula:

or

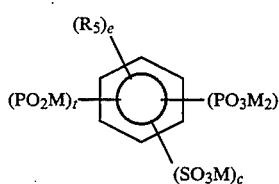

wherein:

c, f and t are the same or different and are 0, 1 or 2, with the proviso that at least one of c, f and t is not 0;

e is 1 or 2;

R$_4$ is alkyl or phenylalkyl substituted with one or more phenoxy, halo, alkoxyphenoxy, alkylphenoxy, carbonyl, hydroxy, carboxylic acid or a salt thereof, alkoxy or phenoxy substituted with one or more sulfonic acid or a salt thereof or carboxylic acid or a salt thereof;

R$_5$ is the same or different at each occurrence and is a hydrogen bonding group selected from the group consisting of hydroxy, halo, carbonyl, carboxylic acid or a salt thereof, or substituted or unsubstituted alkoxyalkyl, alkoxyphenoxy, alkylphenoxy, alkoxy, phenylalkoxy, or phenoxy, or substituted alkyl wherein substituents are one or more sulfonic acid or a salt thereof or carboxylic acid or a salt thereof; or two or more R$_5$ groups together may form a divalent alkenylene chain completing a naphthlene ring substituted with one or more of said hydrogen bonding groups, sulfonic acid or a salt thereof, phosphonic acid or a salt thereof, phosphinic acid or a salt thereof or sulfinic acid or a salt thereof; provided that R$_4$ and R$_5$ are each independently from 1 to about 30 carbon atoms; and M is H$^+$ or other metal or non-metal cation, with the proviso that at least one of M is H$^+$ or is a moiety which can be thermally or chemically transformed into a proton.

20. A composition according to claim 19 wherein said dopants are acids or acid derivatives of the formula:

or

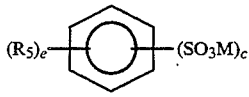

wherein:

c is 1, 2 or 3;

e is 1 or 2;

R$_4$ is alkyl substituted with one or more hydrogen bonding groups selected from the group consisting of phenoxy, phenoxy substituted with one or more sulfonic acid or a salt thereof or carboxylic acid or a salt thereof, hydroxy, carbonyl, or fluoro groups;

R$_5$ is the same or different at each occurrence and is a hydrogen bonding group selected from the group consisting of phenoxy, phenoxy substituted with one or more sulfonic acid or a salt thereof or carboxylic acid or a salt thereof, hydroxy, carbonyl, or two or more R$_5$ groups together may form a divalent alkenylene chain completing a naphthalene ting substituted with one or more of said hydrogen bonding groups, sulfonic acid or a salt thereof, sulfinic acid or a salt thereof, phosphonic acid or a salt thereof, phosphinic acid or a salt thereof provided that R$_4$ and R$_5$ are each independently from 1 to about 30 carbon atoms; and M is H$^+$ or other metal or non-metal cation or a moiety which can be thermally or chemically transformed into a proton.

21. A composition according to claim 20 wherein said dopant is a sulfonic acid or sulfonic derivative of the formula:

or

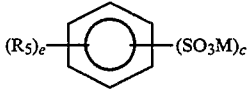

wherein;

R$_4$ is substituted alkyl wherein substituents are one or more fluoro, carboxylic acid or a salt thereof, or hydroxy groups;

c is 1 or 2;

e is 1 or 2;

R$_5$ is the same or different at each occurrence and is hydroxy, phenoxy, phenoxy substituted with one or more sulfonic acid or a salt thereof or carboxylic acid or a salt thereof, halo, carbonyl, or carboxylic acid or a salt thereof or two or more R$_5$ groups together may form a divalent alkenylene chain completing a naphthlene ring which is substituted with one or more of the aforementioned hydrogen bonding groups or sulfonic acid or a salt thereof; and M is a proton, or other metal or non-metal cation, with the proviso that at least one of M is a proton.

22. A composition according to claim 21 wherein R$_5$ is a hydrogen bonding group selected from the group consisting of hydroxy, carboxylic acid or a salt thereof and carbonyl; two or more R$_5$ groups together may form a divalent alkyenlene chain completing a naphthalene ring which is substituted with one or more of the aforementioned hydrogen bonding groups or sulfonic acid or a salt thereof.

23. A composition according to claim 22 wherein said polyaniline is an unsubstituted polyaniline and said dopant is selected from the group consisting of 4-hydroxybenzene sulfonic acid, 1-naphthol 3,6-disulfonic acid, 2,5-di-hydroxybenzene 1,4-disulfonic acid, 3,6-dihydroxynaphthalene 2,7-disulfonic acid, 3-diphenyl ether disulfonic acid, perfluoro butane sulfonic acid and sulfosalicylic acid.

24. An electrically conductive particle comprising a substituted or unsubstituted positively charged conjugated polymer doped with two or more dopant anions at least one of which predominates at or near the surface of said particle and at least one of which predominates at or near the core of said particle, wherein at least one of the dopant anion predominating at or near said core is selected from the group consisting of anions substituted with one or more anionic functionalities and substituted with at least one substituent selected from the group consisting of hydrogen bonding substituents.

25. A particle according to claim 24 wherein said conjugated polymer is polyaniline and wherein said anionic functionalities are selected from the group consisting of sulfur and phosphorus containing anionic functionalities.

26. A composition comprising a matrix formed from one or more thermoplastic polymers, one or more thermosetting resins or a combination thereof having dispersed therein the composition of claim 1.

27. A composition comprising a matrix formed from one or more thermoplastic polymers, one or more thermosetting resins or a combination thereof having dispersed therein the particles of claim 24.

28. An electrically conductive article composed of, or having a component of which is formed from, the composition of claim 1.

29. An electrically conductive article composed of, or having a component of which is formed from, the composition of claim 26.

30. An electrically conductive article composed of, or having a component which is formed from, the composition of claim 27.

* * * * *

UNITED STATES PATENT AND TRADEMARK OFFICE
CERTIFICATE OF CORRECTION

PATENT NO. : 5,422,423
DATED : June 6, 1995
INVENTOR(S) : L.W. Schacklette, Chien-Chun Han, R. L. Elsenbaumer It is certified that error appears in the above-indentified patent and that said Letters Patent is hereby corrected as shown below:

IN THE CLAIMS:

Claim 4, Column 29, line 11, "ting" should read --ring--.
Claim 4, Column 29, line 17, "phosponic" should read --phosphonic--.
Claim 6, Column 29, line 63, add "an" after --phosphonic acid or a salt or--.
Claim 6, Column 29, line 68, "hydoxy" should read --hydroxy--.
Claim 6, Column 30, line 31, "phosponic" should read --phosphonic--.
Claim 6, Column 30, line 33, "therof" should read --thereof--.
Claim 7, Column 30, line 68, "last" should read --least--.
Claim 7, Column 31, line 9, "thereof" should read --thereof,--.
Claim 7, Column 31, line 9, "diallkylamino" should read --dialkylamino--.
Claim 7, Column 31, line 10, "hydoxy" should read --hydroxy--.
Claim 7, Column 31, line 16, "aryloxalkyl" should read --aryloxyalkyl--.
Claim 7, Column 31, line 18, "arysulfinyl" should read --arylsulfinyl--.
Claim 7, Column 31, line 34, "aromatic." should read --aromatic,--.
Claim 7, Column 31, line 41, "diaryamino" should read --diarylamino--.
Claim 7, Column 31, line 41, "phosponic" should read --phosphonic--.
Claim 7, Column 31, line 43, "therof" should read --thereof--.
Claim 7, Column 31, line 47, "cayano" should read --cyano--.

UNITED STATES PATENT AND TRADEMARK OFFICE
CERTIFICATE OF CORRECTION

PATENT NO. : 5,422,423

DATED : June 6, 1995

INVENTOR(S) : L.W. Shacklette, Chien-Chun Han, R. L. Elsenbaumer

It is certified that error appears in the above-indentified patent and that said Letters Patent is hereby corrected as shown below:

Claim 17, Column 33, line 29, "(alkyl)arylamino" should read --alkylarylamino--
Claim 17, Column 33, lines 29-30, "di(alkyl-)arylamino" should read --dialkyl-arylamino--.
Claim 17, Column 33, lines 48-49, "(alkyl-)arylamino" should read --alkyl-arylamino--.
Claim 17, Column 33, line 49, "di(alkyl)arylamino" should read --dialkylarylamino--.
Claim 17, Column 34, line 1, "therof" should read --thereof--.
Claim 18, Column 34, line 44, "carbon" should read --carboxy--.
Claim 18, Column 34, line 47, "carbonate" should read --carboxylate--.
Claim 18, Column 34, line 52, "phenol" should read --phenoxy--.
Claim 18, Column 34, line 55, "one or more," should read --one or more--.
Claim 18, Column 34, line 61, add "a" after --may form--.
Claim 18, Column 34, line 62, "chain chain" should read --chain--.
Claim 18, Column 34, line 62, "alcyclic" should read --alicyclic--.
Claim 19, Column 35, line 56, "phosphinic acid or a salt thereof" should read --phosphinic acid or a salt thereof,--
Claim 20, Column 36, line 25, "ting" should read --ring--

Signed and Sealed this

Thirteenth Day of February, 1996

Attest:

BRUCE LEHMAN

Attesting Officer

Commissioner of Patents and Trademarks